United States Patent [19]
Chan et al.

[11] Patent Number: 5,745,624
[45] Date of Patent: Apr. 28, 1998

[54] AUTOMATIC ALIGNMENT AND LOCKING METHOD AND APPARATUS FOR FIBER OPTIC MODULE MANUFACTURING

[75] Inventors: Eric Yuen-Jun Chan, Mercer Island; Mark William Beranek, Bellevue, both of Wash.

[73] Assignee: The Boeing Company, Seattle, Wash.

[21] Appl. No.: 701,889

[22] Filed: Aug. 23, 1996

[51] Int. Cl.$^6$ .............................. G02B 6/00; G02B 6/36
[52] U.S. Cl. ............................. 385/91; 219/85.14
[58] Field of Search ................... 385/50, 52, 88, 385/89, 90, 91, 92, 147; 219/85.14, 85.18

[56] References Cited

U.S. PATENT DOCUMENTS

| | | | |
|---|---|---|---|
| 3,638,013 | 1/1972 | Keller | 362/32 |
| 3,790,738 | 2/1974 | Laub et al. | 219/85.14 |
| 4,577,083 | 3/1986 | Carreira | 219/85.18 |
| 4,679,908 | 7/1987 | Goodwin | 385/91 |
| 4,690,492 | 9/1987 | Beard | 385/89 |
| 4,702,547 | 10/1987 | Enochs | 385/83 |
| 4,720,163 | 1/1988 | Goodwin et al. | 385/90 |
| 4,741,796 | 5/1988 | Althaus et al. | 385/91 |
| 4,798,442 | 1/1989 | Feilhauer et al. | 385/50 |
| 4,838,639 | 6/1989 | Morankar et al. | 385/91 |
| 5,168,537 | 12/1992 | Rajasekharan et al. | 385/89 |
| 5,297,218 | 3/1994 | Hanaoka | 385/52 |
| 5,311,610 | 5/1994 | Ladany et al. | 385/92 |
| 5,333,225 | 7/1994 | Jacobowitz et al. | 385/93 |
| 5,337,388 | 8/1994 | Jacobowitz et al. | 385/76 |
| 5,469,456 | 11/1995 | Rogers et al. | 385/91 |
| 5,574,814 | 11/1996 | Noddings et al. | 385/76 |

*Primary Examiner*—Akm E. Ullah
*Attorney, Agent, or Firm*—Chistensen O'Connor Johnson & Kindness PLLC

[57] ABSTRACT

A method and apparatus for aligning an optical fiber (120) with an optoelectronic hybrid device (112) and locking the optical fiber in the aligned position are disclosed. A fiber coated with an external layer of gold is threaded through a solder preform (130). The optical fiber (120) rests upon a ceramic substrate (104). The ceramic substrate also supports a device submount (108) that houses the optoelectronic device (112). The ceramic substrate (104) supports a resistor/heater formed of a thin film of nickel-chromium alloy (604). The resistor/heater supports a pad (609) formed of a layer of nickel (610) and a layer of gold (612). Located atop the pad (609) is the solder preform (130). Precise control of heating is provided by applying a predetermined voltage to the resistor/heater (122) for precise time periods, thereby eliminating the necessity of making temperature measurements during heating. As the resistor/heater (122) is energized, the solder preform is liquefied. An open loop search process that utilizes signal strength feedback is used to control the operation of an x–y–z micropositioning stage (328) that precisely positions an arm (306) that supports the optical fiber (120). The alignment system also includes a fixturing setup that includes a probe head (340) having multiple electrical probes (502a, 502b, 504a, 504b) and a vertical rod (506) that applies a downward force to the solder during manufacturing.

21 Claims, 16 Drawing Sheets

AUTOMATIC ALIGNMENT AND LOCKING METHOD AND APPARATUS FOR FIBER OPTIC MODULE MANUFACTURING

FIELD OF THE INVENTION

The present invention relates to manufacturing of optoelectronic devices, and in particular, optical fiber locking and alignment.

BACKGROUND OF THE INVENTION

The manufacture of optoelectronic modules, such as optoelectronic receivers and optoelectronic transmitters, requires that an optical fiber be properly aligned and fixed in an optical subassembly. In an optoelectronic receiver, a fiber is aligned with an optical detector, usually a PIN photodiode. In an optoelectronic transmitter, an optical fiber is aligned with a light-emitting diode (LED) or laser diode. A goal of optical alignment is to minimize the amount of attenuation within the subassembly. The alignment of the fiber optic member with the LED, laser diode, or photodetector is a critical step in the manufacture of an optoelectronic hybrid package. The end of an optical fiber is commonly referred to as a "fiber pigtail." The arrangement whereby a fiber interfaces with an optoelectronic device to form a hybrid optoelectronic package is commonly referred to as a "fiber-pigtailed" hybrid package. The process for interfacing the fiber to the package is called "pigtailing."

The methods used to lock optical fibers inside of any type of optoelectronic packages must be reproducible, and the materials used must be reliable. Further, a successful packaging technique must achieve precise optical fiber locking. The alignment and locking of an optical fiber in optoelectronic packages intended for avionics applications is subject to even more stringent requirements. The methods, apparatus, and materials used must produce highly reliable optoelectronic packages. As discussed below, current techniques have not sufficiently addressed these demands.

Some prior art methods of attaching an optical fiber inside of an optoelectronic package utilize a liquid epoxy to attach the optical fiber to a substrate. Since the curing of epoxy can cause movement of the fiber, in order to ensure proper positioning, alignment of the fiber must be maintained during the solidification process. One disadvantage of epoxy is that it takes a long time to cure, which increases assembly time. Also, epoxy does not maintain its strength over wide temperature ranges, thereby limiting the environments within which it can be used.

Some methods of attaching an optical fiber inside of an optoelectronic package use high melting point bonding materials, such as silicon. The use of high melting point bonding materials limits assembly operations before the fiber-locking is completed.

An alternative to using epoxy and expensive, low melting point materials to lock optical fibers inside of optoelectronic packages is to use solder as the bonding medium. Since some materials tend to degrade during heating, the use of solder requires the employment of a method of alignment that can be completed rapidly in order to limit the amount of heat applied and allow the resulting bond to rapidly cool. Some prior art systems that use solder as a bonding medium employ thermocouples to provide feedback regarding the amount of heat created within the optoelectronic package. In the case of small optoelectronic packages, the use of thermocouples may not be practical. It is desirable therefore to provide a method of soldering that does not employ thermocouples and, preferably, does not require temperature feedback.

An apparatus that employs solder as the bonding medium is described in copending patent application Ser. No. 08/548, 179, filed Oct. 25, 1995. This patent application discloses an optoelectronic module assembly that includes an optical fiber cable assembly and a feedthrough assembly that provide high-reliability optical fiber alignment, locking, and sealing. The application discloses an optoelectronic package that comprises a housing that includes a sidewall with an aperture through the sidewall, and a floor with an overlying substrate. A solder lock joint on the substrate is formed of a reflowed solder preform. The preform surrounds at least part of the metallized portion of the fiber so as to hold the fiber in its desired position, in alignment with an optoelectronic device in the package. After the fiber is inserted through the preform and aligned properly, the preform is heated, causing the preform to melt, flow around the fiber, and form the lock joint. While the resulting optoelectronic package has high reliability and performance, the method of manufacture is slow and labor-intensive. It is desirable to provide a similarly reliable package using an automated alignment and locking method and apparatus that are suitable for use in a commercial manufacturing environment.

In summary, methods and apparatus, including the tools and materials, used to align and lock optical fibers inside of optoelectronic packages, particularly optoelectronic packages intended for avionic use, should employ a total integrated solution, which is automated, reliable, and repeatable. The present invention is directed to providing such a method and apparatus.

SUMMARY OF THE INVENTION

In accordance with this invention, an apparatus for aligning an optical fiber with an optoelectronic device and a related method are provided. The optoelectronic device may be a receiver for receiving light exiting from the optical fiber, or an emitter for emitting light into the optical fiber. The system employs an instrument for measuring the amount of light transmitted between the optical fiber and the optoelectronic device, either from the optical fiber to the optoelectronic receiver, or from the optoelectronic light emitter into the optical fiber. The system supplies electrical current to a resistor overlying a substrate, resulting in the formation of heat, which causes melting of a solder preform placed on the resistor. While the solder is molten, the optical fiber is aligned with the optoelectronic device. The resolidified solder forms a solder lock joint. The solder lock joint is the result of a chemical bond between the solder, which encloses the optical fiber, and the resistor overlying the substrate.

In accordance with further aspects of this invention, the system includes a computer having a monitor and an input device. The computer controls the alignment of the optical fiber and electrical current supplied to the resistor. The computer receives data from the instrument that measures the amount of light transmitted between the optical fiber and the optoelectronic device.

In accordance with other aspects of this invention, the resistor is a thin metallic film resistor formed of a material that bonds with solder. The thin metallic film resistor overlies the substrate and generates heat when electrical current is applied. As a result, this resistor is called a resistor/heater. Solder placed on the resistor/heater becomes molten when the resistor/heater reaches the solder's melting temperature. When this occurs, a chemical bond is formed with the metallic resistor/heater.

In accordance with other further aspects of this invention, a manipulator connected to and controlled by the computer aligns the optical fiber with the optoelectronic device when the solder is melted.

In accordance with still other aspects of this invention, the resistor/heater is made up of a thin layer of nickel-chromium alloy deposited on the substrate, and a thin layer of nickel deposited on portions of the nickel-chromium alloy layer. A thin layer of gold is deposited on the layer of nickel to form a pad upon which the solder rests and to which the solder binds.

In accordance with yet other aspects of this invention, the solder preform has an aperture through which the optical fiber is inserted prior to alignment of the optical fiber. The solder preferably is made up of tin (Sn) and silver (Ag), preferably in a composition of Sn96.5 Ag3.5 (by weight).

In accordance with yet still other aspects of this invention, the apparatus includes a probe head having two device probes that connect to terminals of the optoelectronic device. If the optoelectronic device is a light emitter, the device probes connect the light source to a source of electrical power, which is connected to and controlled by the computer. If the optoelectronic device is a light detector, the device probes connect the light detector to a current-sensing instrument, which measures the amount of photocurrent produced by the light detector, the amount of photocurrent being indicative of the amount of light received by the light detector. A typical light detector is a PIN photodiode. A typical light source is a light-emitting diode (LED).

In accordance with still further aspects of this invention, the probe head includes two resistor probes for connecting the resistor/heater to a power source. The probe head also includes a vertical aluminum rod that contacts the top surface of the solder preform and stabilizes the preform during heating of the resistor/heater.

In accordance with yet still further aspects of this invention, in order to control the temperature and duration of heat applied to the solder, the alignment and locking of an optical fiber includes precise control of the voltage applied to the resistor/heater. The voltage, which is controlled by the computer, begins at a level sufficient to create heat above the melting point of the solder. After a predetermined time interval, the voltage is decreased slightly. Preferably, the decrease in voltage occurs over 20 stages during an interval of 8 seconds. At a predetermined time at which the solder becomes molten, automatic manipulation of the optical fiber takes place. The automatic manipulation precisely aligns the fiber with the optoelectronic device. When the alignment is completed, the power applied to the resistor/heater is turned off, allowing the molten solder to cool and solidify, locking the optical fiber in place.

In accordance with still other further aspects of this invention, the alignment of the optical fiber with the optoelectronic device includes an open loop search for the optimal position of the fiber. The fiber is moved, by the manipulator, in small increments in one direction along an axis. After each movement, the amount of light transmitted between the fiber and the optoelectronic device is measured. At the point where the amount of light measured is less than the amount of light measured at the immediately previous point, the direction of movement of the fiber is reversed. After movement in both directions along an axis is completed, the search along that axis is complete. Searches are done along all three Cartesian coordinate, i.e., the x, y, and z, axes. Preferably, a coarse search, using coarse intervals of movement, is performed prior to melting of the solder, and a fine search, utilizing small increments of movement is performed while the solder is molten.

In accordance with yet still other further aspects of this invention, the optoelectronic device is contained within an optoelectronic hybrid package A preferred optoelectronic hybrid package includes a housing having a sidewall with an aperture through the sidewall, and a floor having an overlying substrate. The thin film resistor overlies the package substrate, and the fiber is secured to the substrate.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
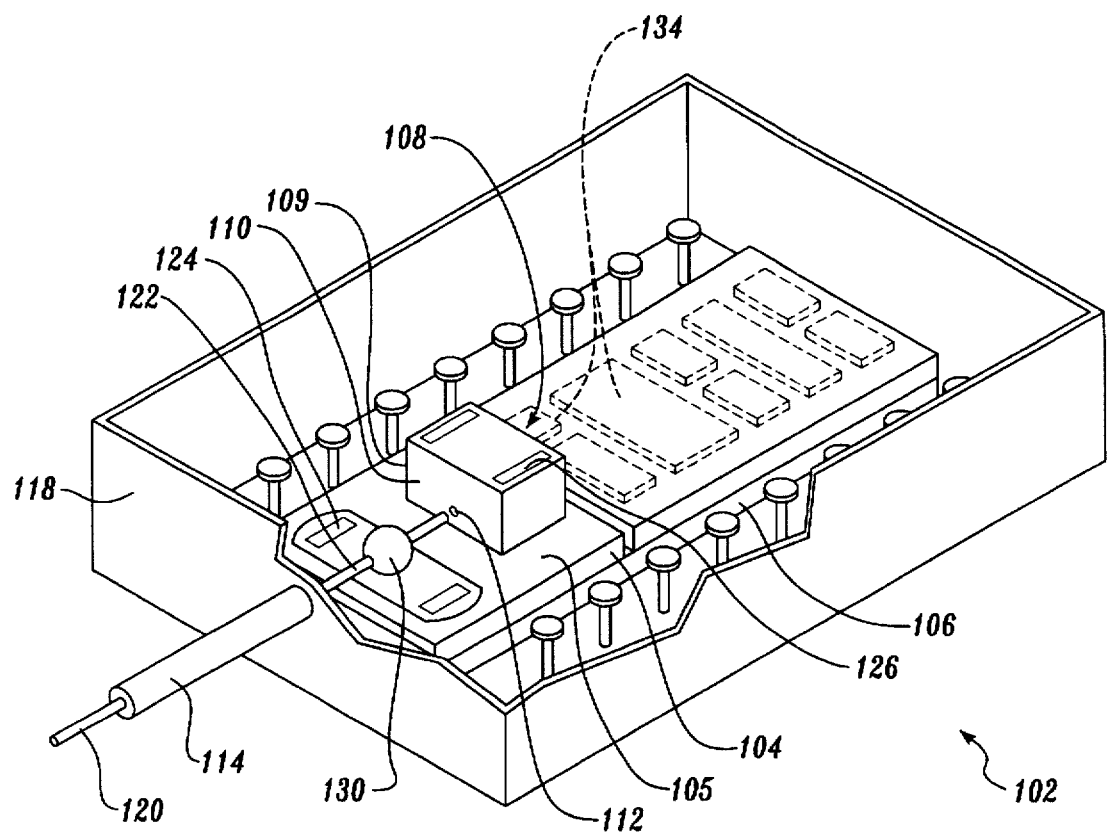
FIG. 1 is a pictorial diagram illustrating an optoelectronic hybrid package incorporating a fiber optic interface formed according to this invention.
Figure 2:
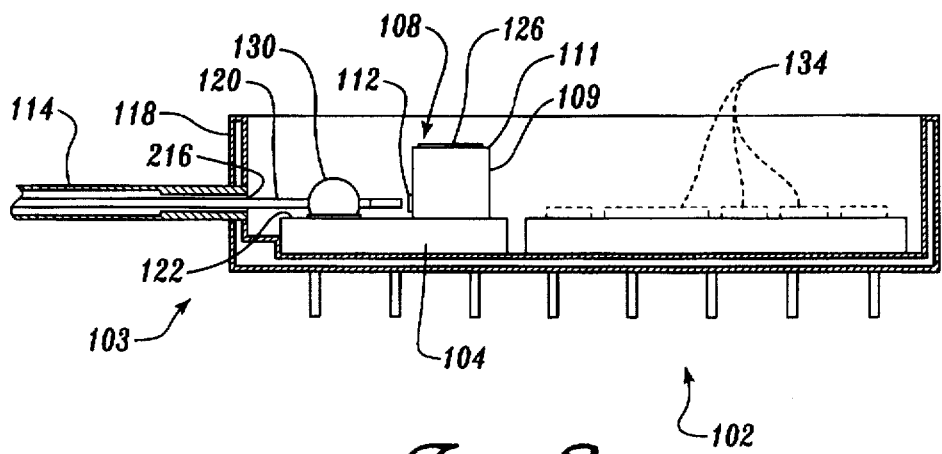
FIG. 2 is a longitudinal, cross-sectional side view of the optoelectronic hybrid package illustrated in FIG. 1.

FIG. 1 is a pictorial diagram illustrating an exemplary optoelectronic hybrid package 102 incorporating a fiber optic interface aligned and locked using the method and apparatus of the invention. FIG. 2 is a side view of the exemplary optoelectronic hybrid package illustrated in FIG. 1. The hybrid package 102 may be an optical receiver or optical transmitter, such as specified by the Aeronautical Radio, Inc. (ARINC) 636 standard. The following description of the preferred embodiment of the invention is based on the exemplary optoelectronic hybrid package 102 illustrated in FIG. 1 and FIG. 2. Obviously, changes may be required for other types of optoelectronic packages.

The optoelectronic hybrid package 102 illustrated in FIGS. 1 and 2 includes a header assembly 103 having a device floor 106 and sidewalls 118. A substrate 104 is mounted on the device floor 106. The substrate 104 is preferably a ceramic substrate, which serves as a heat sink that disperses heat generated by electronic circuitry mounted on the substrate. A device submount 108 is mounted atop the substrate 104. The device submount 108 includes a block 109 and an optoelectronic device 112 mounted on a side 110 of the block 109. The optoelectronic device 112 is a light detector, such as a PIN photodiode, when the hybrid package 102 is an optical receiver. The optoelectronic device is a light emitter, such as an LED or laser diode, when the hybrid package is an optical transmitter. A cylindrical hermetic feedthrough 114 leads to an aperture 216 formed in the package sidewall 118 in alignment with the optoelectronic device 112. The hermetic feedthrough 114 is preferably a Kovar tube with a gold-plated interior that is braised to the sidewall 118 of the package. An optical fiber 120 extends through the hermetic feedthrough and the aperture 216. The hermetic feedthrough is more fully disclosed in copending patent application Ser. No. 08/548,179, filed on Oct. 25, 1995, the subject matter of which is incorporated herein by reference. Preferably, the optical fiber 120 is a commercially available sleeved gold metallized optical fiber. The sleeving (not shown) is preferably a high-temperature plastic that is physically and chemically stable over a wide temperature range.

The optical fiber 120 is held in proper alignment by a fiber lock joint. In accordance with the invention, the fiber lock joint is formed by the liquefaction and solidification of a solder preform 130. As also described more fully below, when the lock joint is formed, the solder bonds to a thin film resistor/heater 122 located atop the substrate 104.

FIGS. 1 and 2 also illustrate the circuitry 134 housed within the hybrid package 102. The circuitry 134 is added after aligning and locking the optical fiber 120. Prior to installation of the circuitry 134, a hybrid package 102 is commonly referred to as an optical header assembly.

Figure 3:
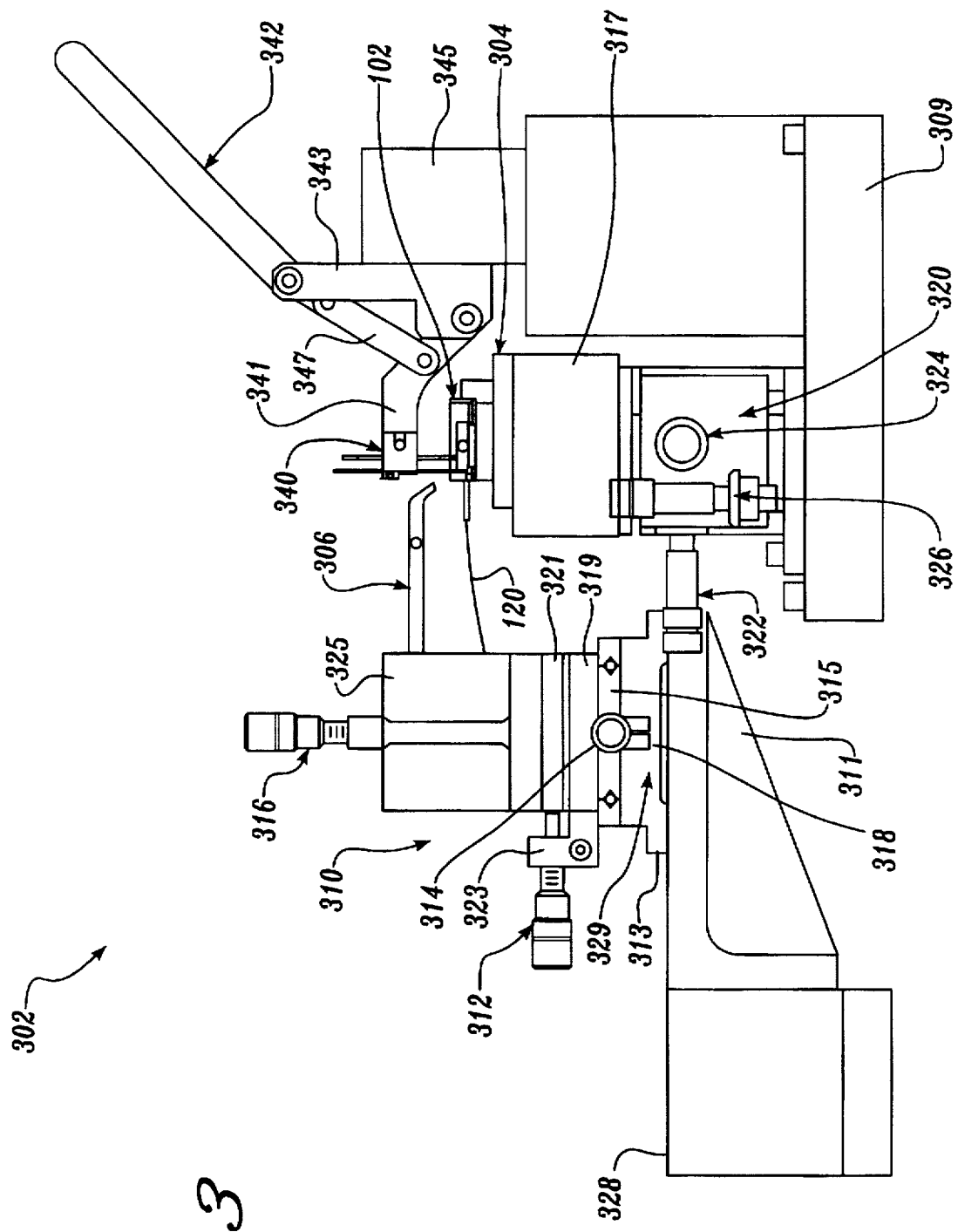
FIG. 3 is a side elevational view of an alignment system fixturing setup for fiber optic module manufacturing according to the invention.
Figure 4:
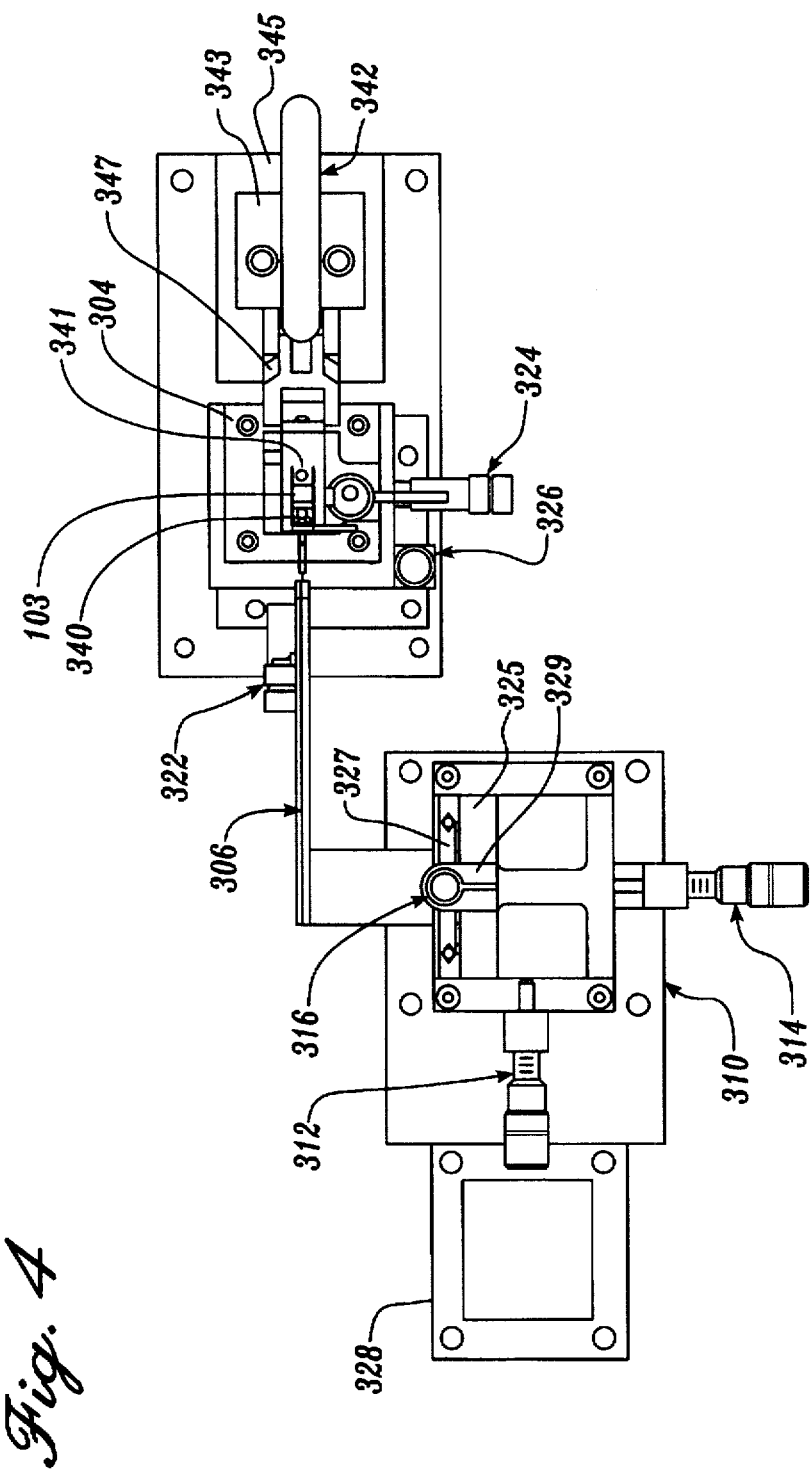
FIG. 4 is a top plan view of the alignment system fixturing setup illustrated in FIG. 3.

FIG. 3 and FIG. 4 are elevational side and top plan views, respectively, of an alignment fixturing setup 302 suitable for use in an automatic alignment and locking system formed in accordance with the invention of the type illustrated in FIGS. 7 and 8, and described below. The alignment system fixturing setup is usually employed prior to installation of circuitry 134, i.e., when the hybrid package 102 is empty. The header assembly with a substrate 104, a device submount 108, and a hermetic feedthrough is secured to an alignment nest fixture 304 on the fixturing setup 302. The alignment nest fixture 304 holds the header assembly securely in place relative to the fixturing setup 302. A fiber manipulator 306, which comprises an outwardly extending arm having an inverted V-shaped groove at its outer end, grips the optical fiber 120 between the sidewall 118 of the hybrid package and the location of the solder preform 130 and aligns the optical fiber 120 relative to the optoelectronic device 112.

If necessary, the position of the alignment nest fixture can be positioned along Cartesian coordinate, i.e., x, y, z, axes, by an adjustment subfixture 320. The adjustment subfixture 320 is mounted on a base 309 and includes an x-axis adjustment control 322, a y-axis adjustment control 324, and a z-axis adjustment control 326. The x and y axes are horizontal and the z-axis is vertical. The adjustment subfixture supports a table 317 on which the alignment nest fixture 304 is mounted. While various commercially available adjustment subfixtures can be used, one suitable subfixture is an XYZ Micropositioning Stage produced by Photon Control of Cambridge, England.

Two subsystems manipulate and align the optical fiber 120 with respect to the optoelectronic device 112. A manual alignment subsystem 310 allows manual manipulation of the fiber manipulator 306 and, thus, the optical fiber, along Cartesian coordinate, i.e., x, y, and z, axes. In this regard, the manual alignment subsystem 310 includes an x-axis micrometer adjustment control 312, a y-axis micrometer adjustment control 314, and a z-axis micrometer adjustment control 316. These controls allow an operator to manually position the fiber manipulator 306 to obtain a coarse alignment of the optoelectronic device 112 and the optical fiber 120. Preferably, a microscope (not shown) is used to magnify the area where the optical fiber 120 and the optoelectronic device 112 meet to assist manual alignment.

The manual alignment subsystem 310 is mounted on a bracket 311. Mounted on the bracket 311 is a y-axis support 313. The y-axis support 313 supports a y-axis table 315 that is movable along a horizontal axis only. The position of the y-axis table 315 is controlled by the y-axis micrometer control 314. More specifically, the housing of the y-axis micrometer control is supported by an arm 318 attached to the y-axis support. The movable element of the y-axis micrometer control is attached to the y-axis table. The y-axis table is supported along opposing edges by bearings that lie in V-shaped grooves.

Mounted on the y-axis table 315 is an x-axis support 319. The x-axis support 319 supports an x-axis table 321 that is movable along a horizontal axis only. The horizontal x-axis lies orthogonal to the horizontal y-axis. The position of the x-axis table is controlled by the x-axis micrometer control 312. More specifically, the housing of the x-axis micrometer control 312 is supported by an arm 323 attached to the x-axis support 319. The movable element of the x-axis micrometer control is attached to the x-axis table 321. The x-axis table is supported along opposing edges by bearings that lie in V-shaped grooves.

Mounted on the x-axis table 321 is a z-axis support 325. The z-axis support 325 supports a z-axis table 327 that is movable along a vertical axis only. The position of the z-axis table is controlled by the z-axis micrometer control 316. More specifically, the housing of the z-axis micrometer control is supported by an arm 329 attached to the z-axis support 325. The movable element of the z-axis micrometer control is attached to the z-axis table. The z-axis table is supported along opposing edges by bearings that lie in V-shaped grooves. The fiber manipulator 306 is mounted on the z-axis table 327. While various commercially available products can be used to form the manual alignment subsystem 310, one suitable product is the X–Y–Z Micropositioner stage manufactured by Line Tool Company of Allentown, Pa.

An automated micropositioning stage 328 controls the position of the bracket 311 and, as a result, the position of the optical fiber 120, via the manual alignment subsystem 310. While various types of micropositioning stages 328 can be used, one commercially available product is the Klinger UT 100.50 PP linear translation stage manufactured by Newport Corp. of Irvine, Calif. The automated micropositioning stage 328 provides an x-axis, a y-axis, and a z-axis fine position control. As described further below, the automated micropositioning stage 328 is connected to, and controlled by, a computer.

As illustrated in FIG. 3, the alignment fixturing setup 302 also includes a probe head 340 whose vertical position is controlled by a probe lever 342. More specifically, the probe head 340 is mounted on one end of a dogleg-shaped arm 341. The other end of the dogleg-shaped arm 341 is hingedly attached to the lower end of a bracket 343. The bracket 343 is mounted on a support 345. The probe lever 342 is hingedly attached to the top of the bracket. A link 347 connects the inner end of the probe lever 342 to the dogleg-shaped arm 341. The probe head 340 overlies the region where the optical fiber 120 meets the optoelectronic device 112. When the probe lever 342 is raised and lowered, the probe head is raised and lowered, thereby establishing or disestablishing contact between probes supported by the probe head 340 and corresponding points on the optoelectronic hybrid 102, described below.

As illustrated in FIG. 1, the hybrid package 102 includes four electrical terminals—two resistor terminals 124 and two device terminals 126. The two resistor terminals 124 rise above the resistor/heater 122 on the ceramic substrate 104. The resistor terminals 124, which are located on opposite sides of the solder preform 130, are connected to the resistor/heater 122. The two device terminals 126 reside on the top surface 111 of the device submount 108. The device terminals 126 are electrically connected to the optoelectronic device 112.

Figure 5:
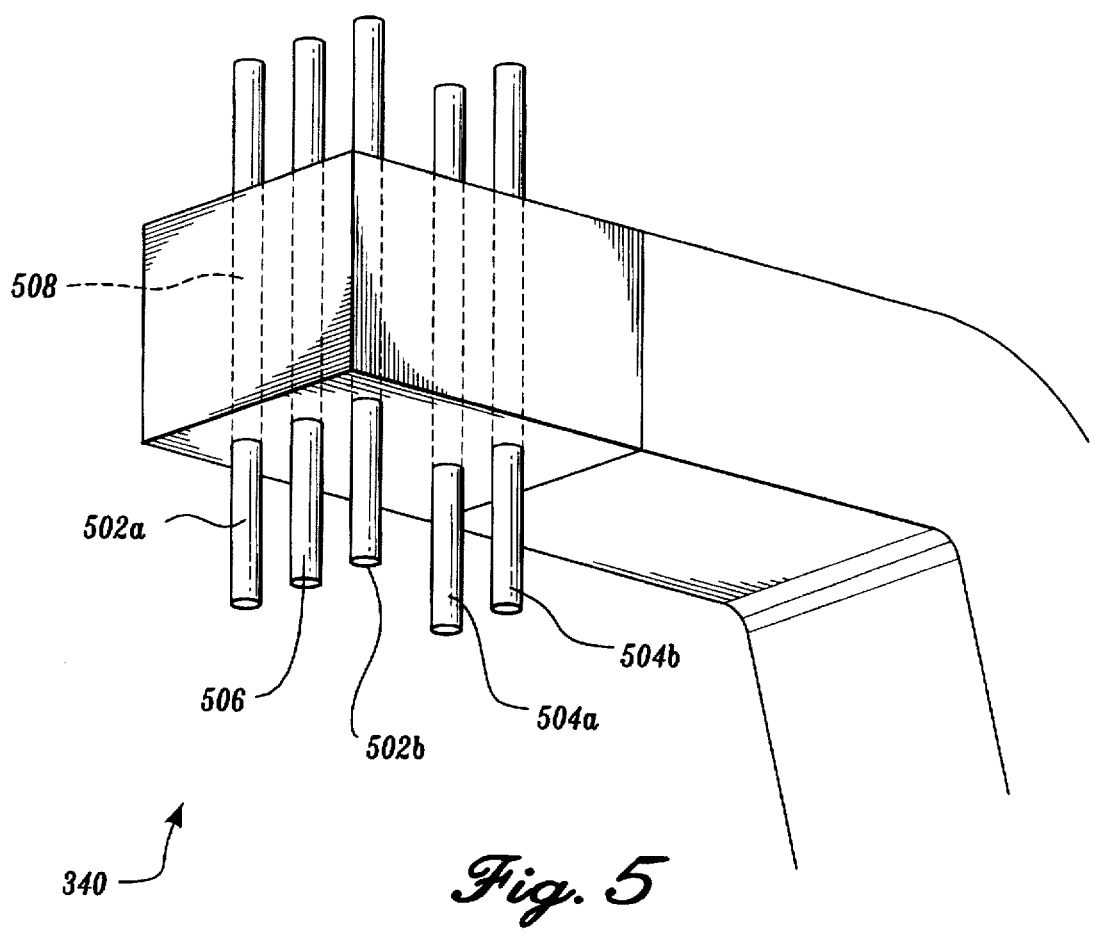
FIG. 5 is a detailed bottom view of the probe head illustrated in FIG. 3.

FIG. 5 is a perspective, upwardly looking view of the probe head 340. The probe head supports two resistor probes 502a and 502b, two device probes 504a and 504b, and a rod 506, all vertically oriented. The resistor probes 502a and 502b are positioned such that, when the probe head 340 is lowered, the resistor probes 502a and 502b come into electrical contact with the resistor terminals 124. The two device probes 504a and 504b are positioned such that when the probe head 340 is lowered the device probes 504a and 504b come into contact with the device terminals 126. Preferably, gold-plated contacts are located at the bottoms of the probes 502a, 502b, 504a, and 504b. The rod 506 is formed of oxidized aluminum and located midway between the resistor probes 502a and 502b in the probe head 340.

The probe head 340 illustrated in FIG. 5 includes five vertically oriented cylindrical holes. The probes 502a, 502b, 504a, and 504b and the rod 506 are slidably inserted into corresponding ones of the cylindrical holes 508. The sliding design allows the probes and the rod to move independently relative to the probe head 340. Independent vertical movement helps to ensure that the probes and the rod make contact in the manner hereinafter described when the probe head is lowered. Preferably, the probes are spring-loaded downwardly.

One suitable probe is a QA Technology 075-PRP2540L/ 075-SDN250S-G probe assembly manufactured by QA Technology of Hampton, N.H. This probe assembly includes a receptacle extending through the top of the cylindrical hole 508 and a spring-loaded contact extending through the bottom of the hole 508. The probe assembly held in place by a press fit. The rod 506 is held in place by friction. A set screw or cam can also be used to hold the rod in place. As will be readily appreciated by those skilled in this art and others, the use of cylindrical tubes to allow vertical movement of the probes and friction to resist vertical movement of the rod when the head is lowered should be considered as exemplary, not limiting, since a variety of alternative ways of accomplishing the same result are available.

Figure 6A:
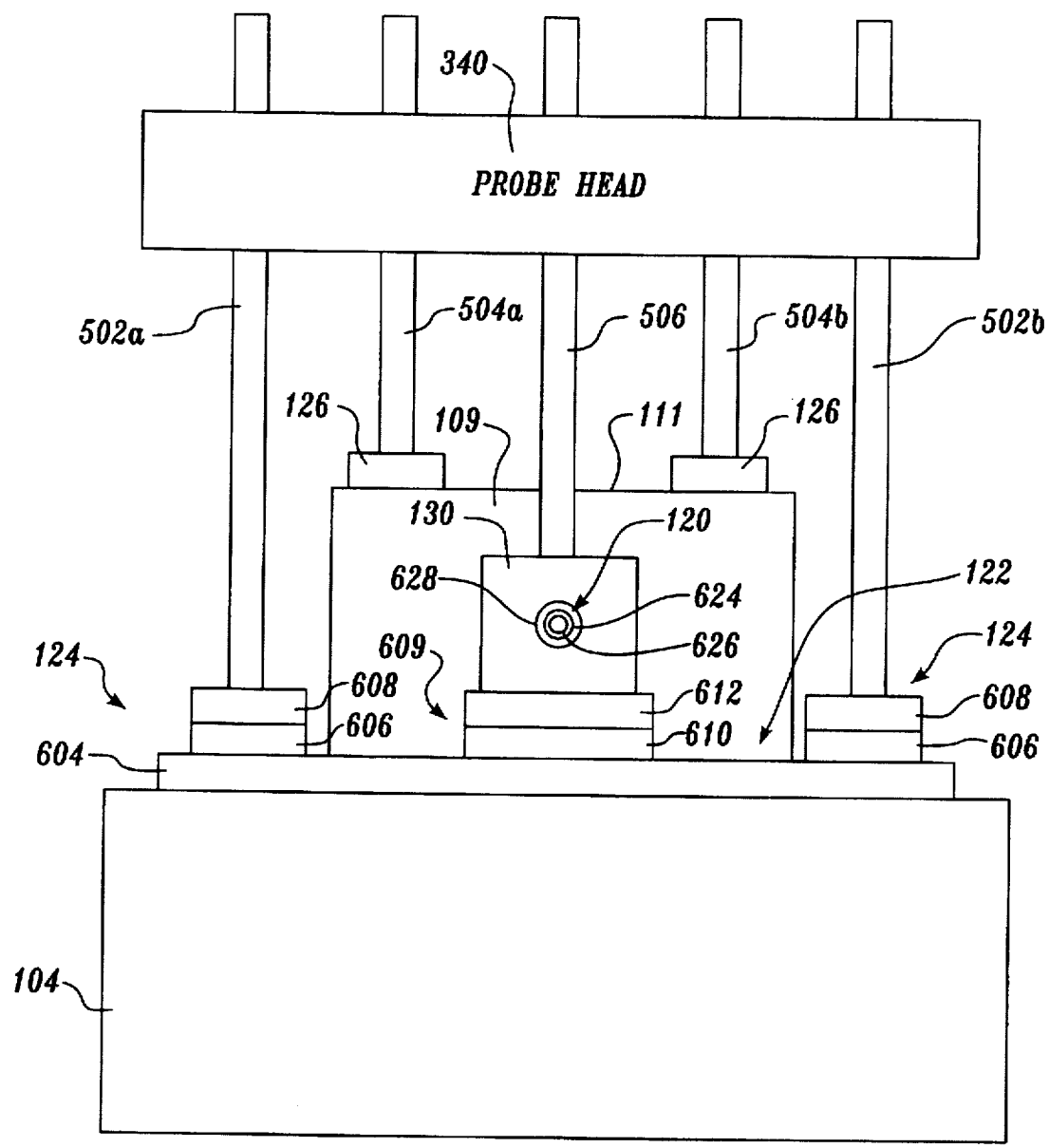
FIGS. 6A, 6B, 6C, and 6D are partial elevational views of an optoelectronic package and a probe head in accordance with the invention.

FIG. 6A is a partial elevational view showing the probe head 340 and the mating of individual probes with their respective terminals when the probe head is lowered. As illustrated in FIG. 6, the resistor terminals 124 rise above the resistor/heater 122, which lies above the ceramic substrate 104. The resistor probes 502a and 502b are aligned with and make electrical contact with the resistor terminals 124, when the probe head is lowered. Likewise, the device terminals 126 rise above the top surface 111 of the device submount 108. The device probes 504a and 504b are aligned with and make electrical contact with the device terminals 126, when the probe head is lowered.

Additionally, the rod 506 is positioned such that, when the probe head 340 is lowered, the rod 506 contacts the top of the solder preform 130. The rod 506 applies downward pressure on the top of the solder preform 130 sufficient to resist vertical movement of the solder preform during heating of the solder preform in the manner described below. Boiling of the flux during heating of the solder can create such vertical movement. The rod 506 thereby functions to stabilize the solder preform 130 during manufacture, thereby minimizing misalignment.

FIG. 6A also illustrates the details of the thin film resistor/heater 122, which, as noted above, lies on the ceramic substrate 104. The ceramic substrate 104 preferably is formed of high-purity alumina. The top of the alumina ceramic substrate is polished to a 1-microinch (maximum) surface finish. The bottom has a lapped 10-microinch (nominal) surface finish. The resistor/heater is formed by a layer of nickel-chromium alloy 604 that lies on the top surface of the ceramic substrate 104. Preferably, the nickel-chromium alloy layer is about 1.250 angstroms in thickness and approximately rectangular shaped.

The resistor terminals 124 are rectangular and oriented such that their longitudinal axes lie approximately parallel to each other and parallel to the longitudinal axis of the optical fiber 120. Each resistor terminal 124 comprises a layer of nickel 606 that lies atop the nickel-chromium alloy layer 604, and a gold layer 608 that lies atop the nickel layer. The gold and nickel layers have the same approximate width and length. The nickel layer 606 preferably has a thickness of approximately 5000 angstroms. The preferred thickness of the gold layer is approximately 3250 angstroms.

An approximately circular pad 609 is generally centered on the nickel-chromium alloy layer 604, midway between the resistor terminals 124. The pad 609 comprises a nickel layer 610 lying atop the nickel-chromium alloy layer 604, and a gold layer 612 overlying the nickel layer 610. The nickel layer 610 and gold layer 612 have approximately the same thicknesses as the nickel layer 606 and the gold layer 608, respectively, of the terminals 124. The diameter of the pad is approximately 0.060 inch.

Preferably, the nickel-chromium alloy layer 604, the nickel layers 606 and 610, and the gold layers 608 and 612 are formed by sputter deposition with no break in vacuum between each material deposition. After deposition, the nickel-chromium alloy layer 604 is unsolderable when heated above the melting point of the solder.

The solder preform 130 is preferably formed of SnAg solder. When molten, an intermetallic alloy is formed by the tin of the solder and the nickel layer 610 of the pad 609. In one actual embodiment of the invention, the solder preform comprises Sn96.5 Ag3.5, and has a melting temperature of 221° C. A small amount of solder flux, such as Indium Corporation of America No. 5R solder flux, is used to assist in adhering the solder preform 130 to the pad 609. Since molten SnAg solder can erode nickel under certain conditions, certain criteria must be met when practicing the invention. Specifically, the maximum temperature and the duration of the heating must be chosen so as to minimize the erosion of the nickel layer 610. In addition, the nickel layer 610 must be thick enough to withstand whatever erosion occurs while the molten solder is in contact with the nickel. Also, because the resistance of the nickel-chromium alloy resistor/heater 122 changes with time when power is applied, power must be carefully controlled and applied over a short period of time in order to maintain precise control over the temperature and duration of the heat provided by the resistor/heater. How this is accomplished is described below.

In addition to a bond being created between the solder preform and the resistor/heater 122 when heat is generated, a bond between the optical fiber 120 and the solder preform is created. More specifically, nickel underlayer 624 and gold overlayer 626 surround the optical fiber 120. When heat is created by applying power to the resistor/heater 122, an intermetallic alloy is formed by the tin of the solder and the nickel underlayer 624 of the optical fiber.

Figure 6B:
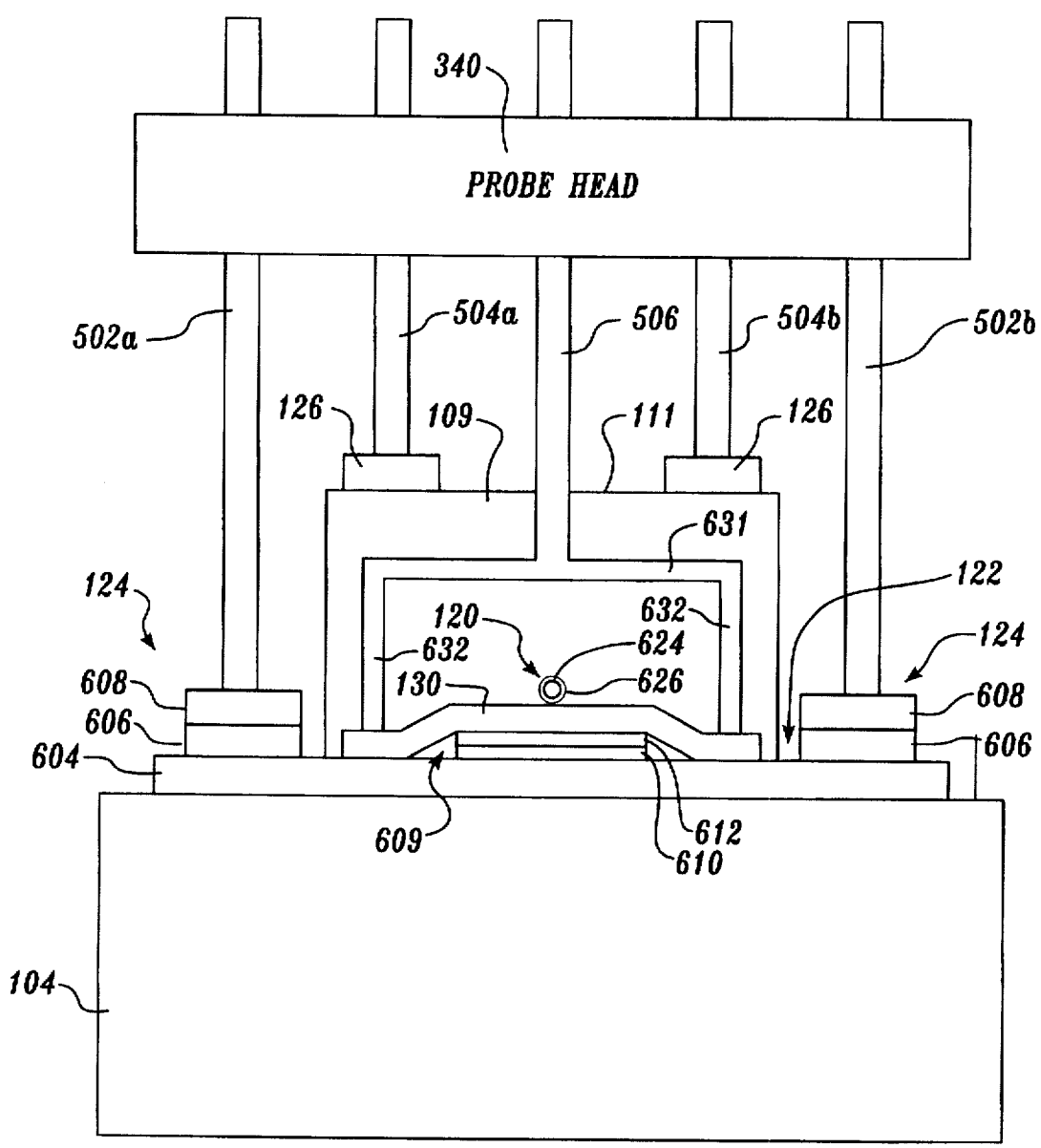
Figure 6C:
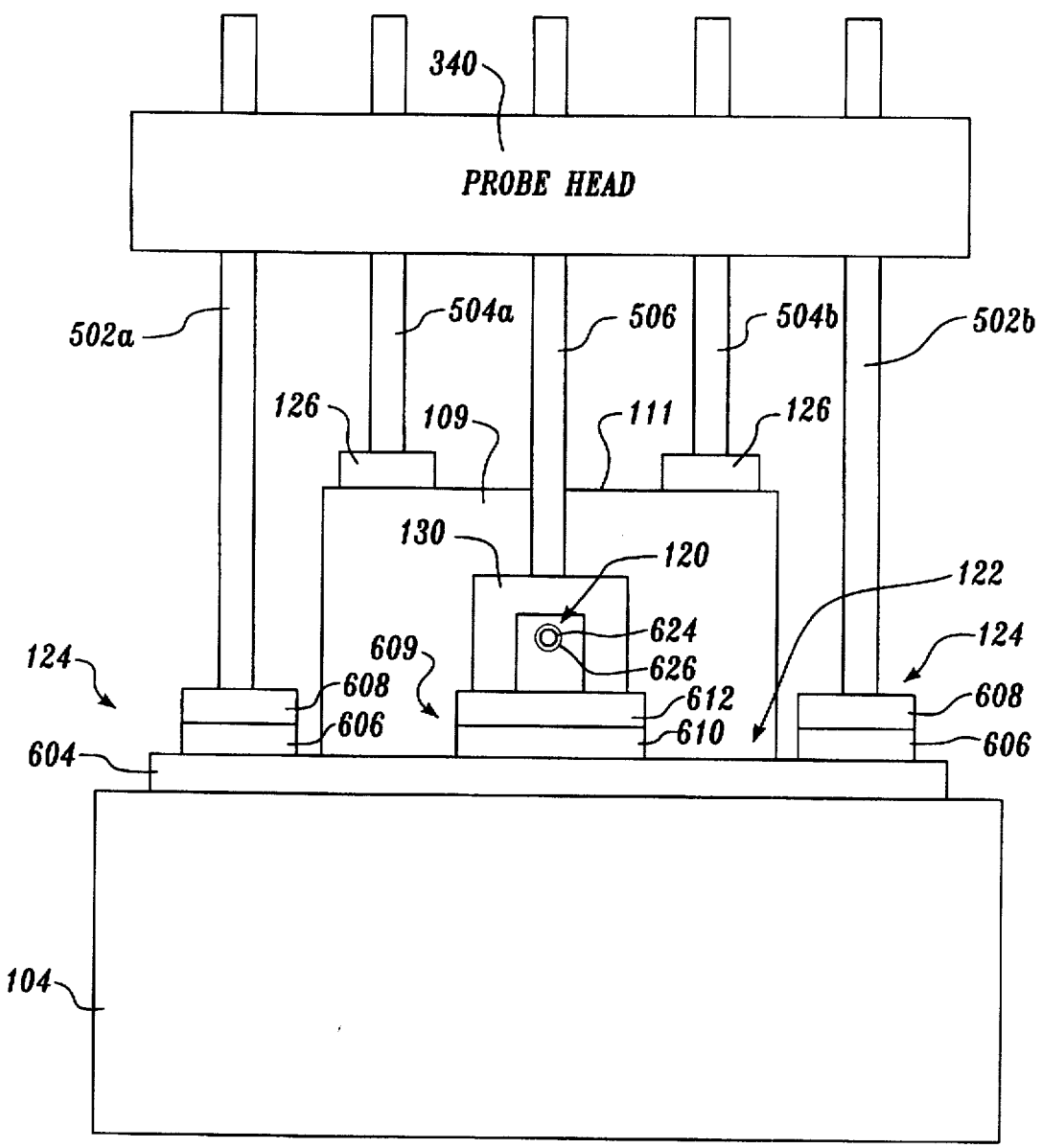
Figure 6D:
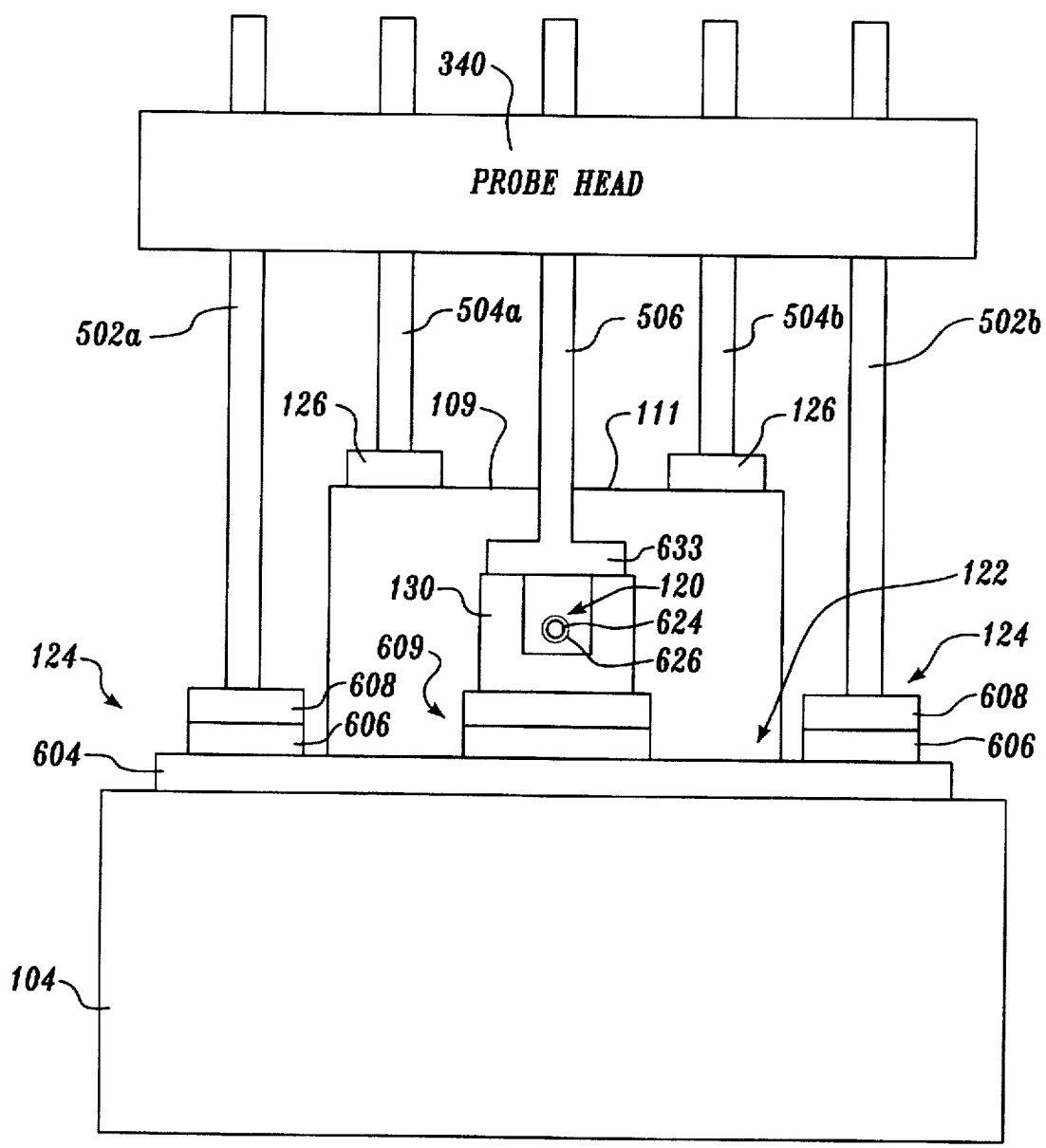

FIGS. 6B through 6D illustrate alternative configurations of the solder preform 130 and rod 506. FIG. 6B illustrates a substantially flat solder preform 130 positioned above and extending beyond the circular pad 609. The optical fiber 120 is positioned adjacent and above the solder preform 130. The rod 506 illustrated in FIG. 6B includes a two-pronged fork 630 at the lower end of the rod 506. A horizontal base 631 of the fork 630 is approximately perpendicular to the vertical orientation of the rod 506. Two side prongs 632 extend vertically downward from the ends of the fork base 631. The rod 506 is positioned so that the side prongs 632 of the fork 630 applies downward pressure on the top of the solder preform 130 sufficient to resist vertical movement of the solder preform during heating of the solder preform in the manner described below.

FIG. 6C illustrates an inverted U-shaped solder preform 130 surrounding the optical fiber 120. An inverted U-shaped solder preform 130 may be positioned on the circular pad 609 after the optical fiber 120 is manually positioned above the circular pad 609. As described above, the rod 506 applies downward pressure on the top of the solder preform 130 sufficient to resist vertical movement of the solder preform during heating of the solder preform in the manner described below.

FIG. 6D illustrates a U-shaped solder preform 130. The rod 506 in FIG. 6D is T-shaped, having a horizontal base 633 sized approximately to the width of the solder preform 130. The T-shaped rod 506 applies downward pressure on the top of the solder preform 130 sufficient to resist vertical movement of the solder preform during heating of the solder preform in the manner described below.

Figure 7:
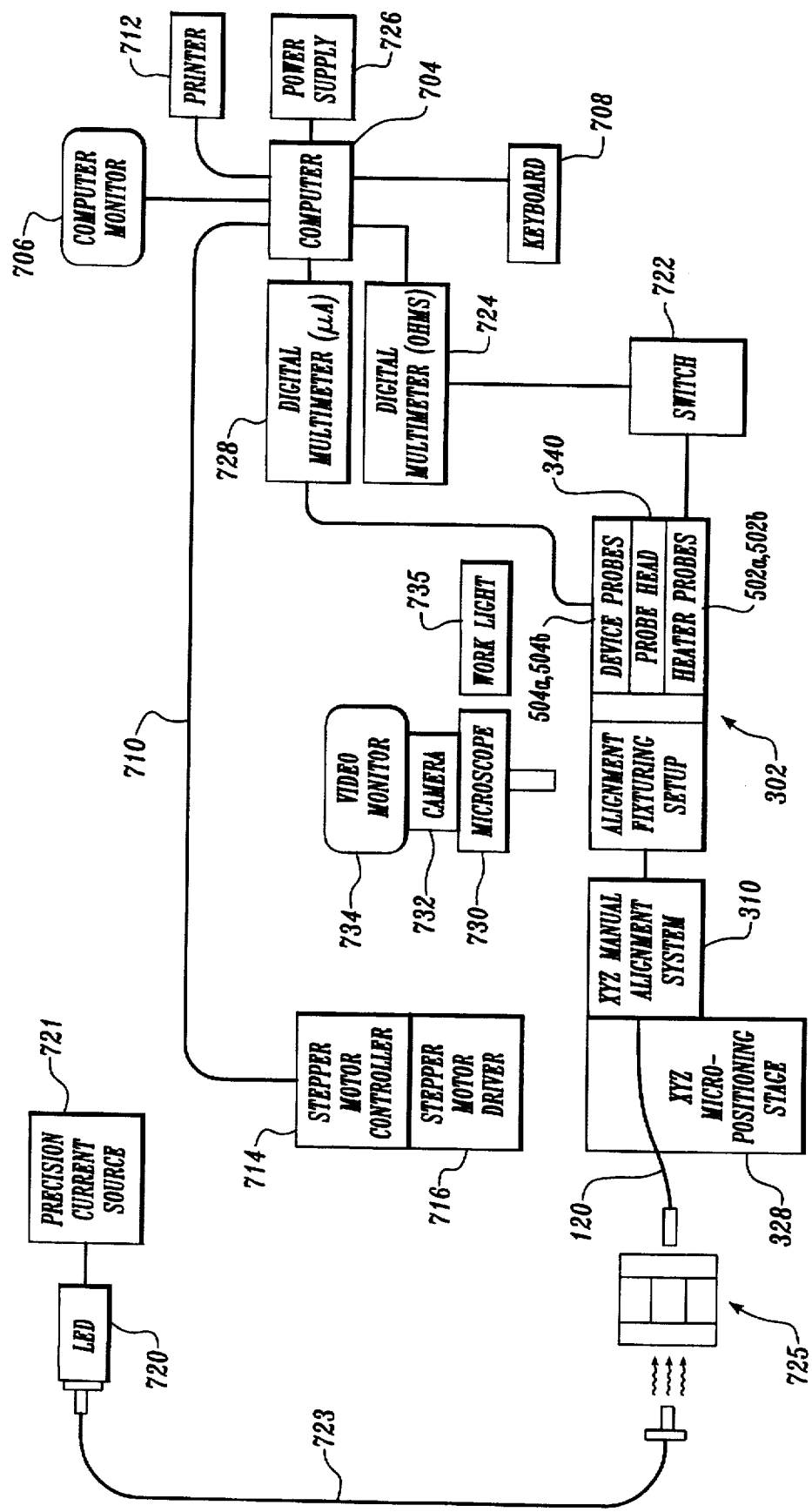
FIG. 7 is a block diagram of an automatic alignment and locking system for an optoelectronic receiver according to the invention.
Figure 8:
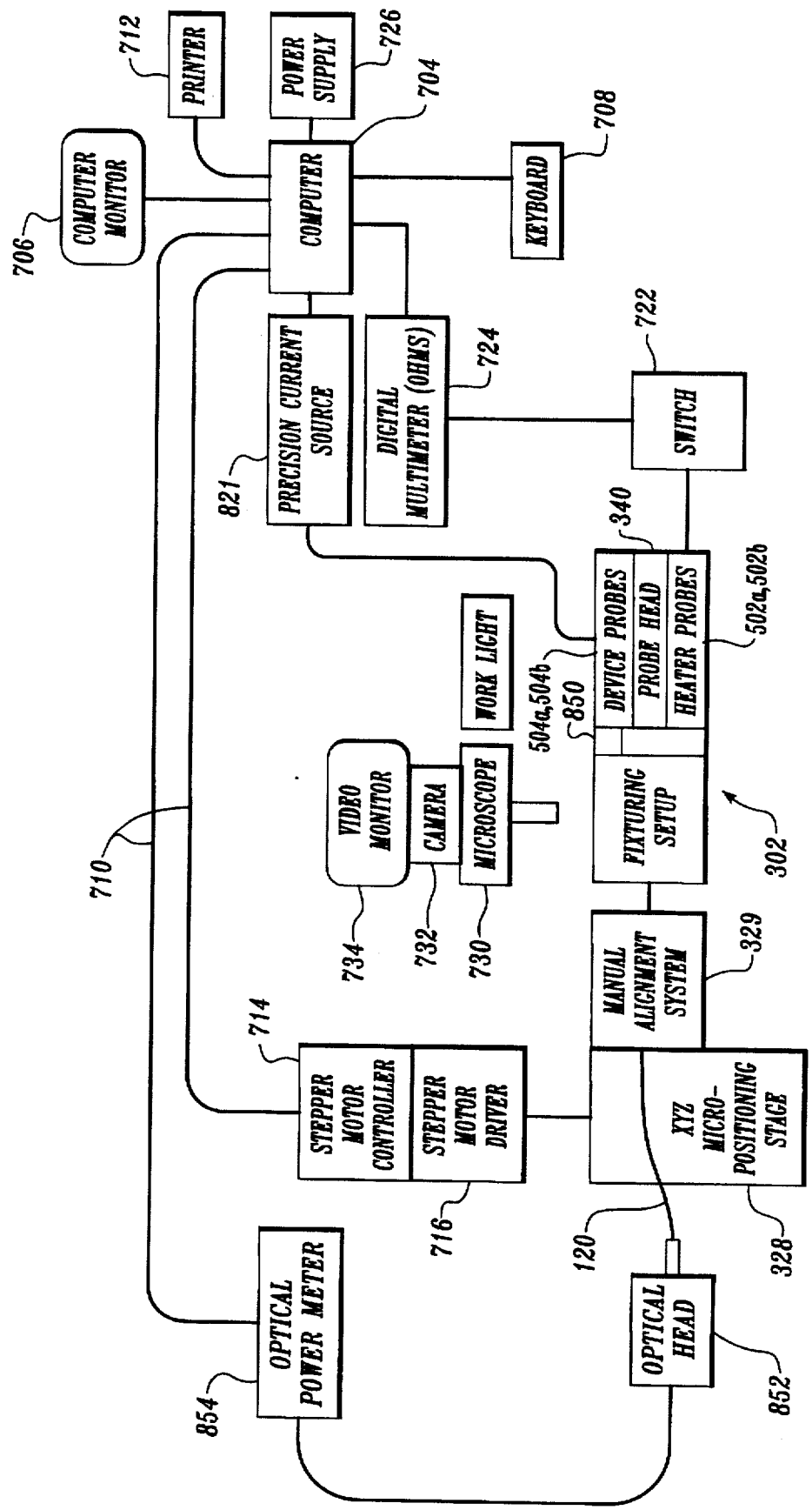
FIG. 8 is a block diagram of an automatic alignment and locking system for an optoelectronic transmitter according to the invention.

FIGS. 7 and 8 are block diagrams of automatic alignment and locking systems for optoelectronic receiver and optoelectronic transmitters, respectively, according to the invention. The diagrams, which are generally similar, include the electronic components of the system and the mechanical components that are electronically controlled. The manually controlled elements of the alignment fixturing setup 302 shown in FIGS. 3 and 4 and described above are not depicted in detail. They are shown in block form with only the probe head 340 and the probes 502a, 502b, 504a, and 504b being broken out.

The automatic alignment and locking systems shown in FIGS. 7 and 8 include a computer 704 connected to a monitor 706, a keyboard 708, a digital bus 710, such as an IEEE 488 bus, and an optional printer 712. A stepping motor controller 714 that controls a stepping motor power driver 716 is connected to the digital bus 710. The stepping motor controller 714 and stepping motor power driver 716 form part of and control operation of the micropositioning stage 328. As described above, the micropositioning stage 328 controls the position of the manual alignment subsystem 310. The manual alignment subsystem 310 controls the position of the fiber manipulator 306, which, in turn, controls the position of the optical fiber 120. If the chosen XYZ microprocessing stage 328 is the Klinger NT 100.50PP linear translation state referenced above, a suitable stepping motor controller is the Klinger MC4 and a suitable stepper motor driver is the Klinger MD4 also produced by Newport Corp. of Irvine, Calif.

FIGS. 7 and 8 also include a microscope 730 positioned to view the region where the optical fiber 120 is to be aligned with the optoelectronic device 112, a video camera 732 positioned to view the output of the microscope 730, and a video monitor 734 for displaying the pictures captured by the video camera 732. A work light 735 is provided to illuminate the image area. As noted above, the microscope 730, camera 732, and video monitor 734 allow an operator to manually adjust the alignment fixturing setup 302 (if necessary) and the manual alignment subsystem 310.

FIGS. 7 and 8 also include a switch 722, a resistance measuring digital multimeter 724 and a power supply 726. The switch controls the application of power produced by the power supply 726 to the resistor probes 502a and 502b. The computer 704 controls the power generated by the power supply 726. The resistance measuring digital multimeter measures the resistance of the heater/resistor and supplies this information, in digital form, to the computer 704. More specifically, the resistor probes 502a and 502b of the probe head 340 are electrically connected to a three-position toggle switch 722. The toggle switch 722 allows the probes to be switched between the resistance measuring digital multimeter 724, and the power supply 726. A suitable digital multimeter having a resistance measuring function is the 197A multimeter produced by Keithley Instruments of Cleveland, Ohio. A suitable power supply is HP 6033A power supply produced by Hewlett-Packard Corp. The switch 722, a multimeter 724, and power supply 726 combination allows the resistance across the resistor/heater 122 to be measured, and, alternatively, electrical power to be applied to the terminals 124 of the resistor/heater 122.

The foregoing description has described the components that are common to the optoelectronic receiver automatic alignment and locking system shown in FIG. 7 and the optoelectronic transmitter automatic alignment and locking system shown in FIG. 8. In addition to the foregoing components, the optoelectronic receiver automatic alignment and locking system (FIG. 7) includes a current-measuring digital multimeter 728, which may also be a Keithley 197A multimeter, electrically connected to the device probes 504a and 504b. The output of the current-measuring digital multimeter is applied to the computer 704. The current-measuring digital multimeter 728 measures the photocurrent produced by the optoelectronic device 112, which is preferably a PIN photodiode, when the device receives light from the optical fiber 120. The photocurrent is measured in microamperes. Rather than being separately connected to the computer, as shown in FIG. 7, the power supply 726, the resistance-measuring digital multimeter 724, the current measuring digital multimeter 728, and the stepper motor controller 714 could all be connected to the computer 704 via a common data bus.

In addition to the foregoing components, the optoelectronic receiver automatic alignment and locking system illustrated in FIG. 7 includes a precision current source 721 and an LED 720 powered by the precision current source 721. The LED 720 is coupled to one end of a fiber optic patch cord 723. The other end of the fiber optic patch cord 723 is coupled to the remote end of the optical fiber 120 to be aligned by a suitable optical coupling mechanism 725. The LED 720 provides the light that is detected by the optoelectronic device 112, i.e., the PIN diode, during alignment and locking of the optical fiber 120 in the manner described below.

The automatic alignment and locking system for an optoelectronic transmitter (FIG. 8) also includes a precision current source 821. However, rather than being used to supply power to an LED that lights the remote end of the optical fiber 120 to be aligned, the precision current source 821 is connected to the device probes 504a and 504b to supply current to the optoelectronic device 112, which, in the case of a transmitter, is an LED. Further, the current-measuring digital multimeter is eliminated. As with the precision current source 721 shown in FIG. 7, a suitable current source is an ILX Lightwave LDX-3207 manufactured by ILX Lightwave of Bozeman, Mont.

In addition, rather than including a precision power source, an LED, and a coupling medium at the remote end of the optical fiber 120 to be aligned, the optoelectronic transmitter alignment and locking system shown in FIG. 8 includes an optical head 852 and an optical power meter 854. The optical head 852 is optically coupled to the remote end of the optical fiber 120 to be aligned, and the electrical output of the optical head is connected to the optical power meter 854. The optical power meter produces a digital output representative of the light received by the optical head 852 from the optical fiber 120 to be aligned. The digital output of the optical power meter 854 is supplied to the computer 704, preferably via a common digital data bus.

Prior to describing how the computer 704 controls the various elements shown in FIGS. 7 and 8 and described above, the nature of the solder preform 130 and how it melts and reforms are described. In this regard, attention is directed to FIGS. 9A and 9B.

Figure 9A:
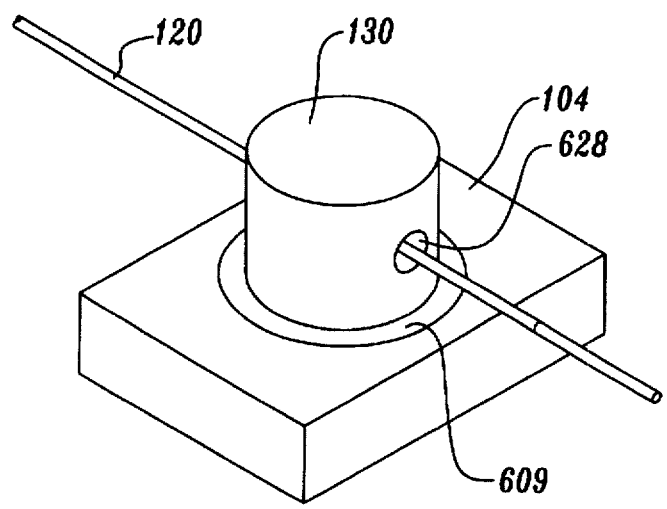
FIGS. 9A and 9B illustrate the sequence of insertion of a fiber through a solder preform and reflowing of the preform according to a preferred embodiment of the invention.
Figure 9B:
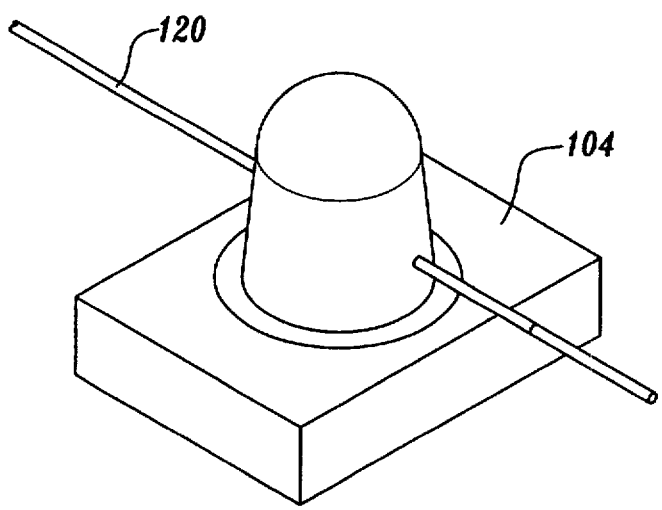

FIGS. 9A and 9B illustrate an optical fiber 120 passing through a solder preform 130 both before and after alignment and reflow of the solder preform according to the invention. The solder preform 130 comprises a solid piece of solder, preferably SnAg solder, having a generally horizontal, approximately cylindrical aperture 628 extending through it. The aperture 628 is sized to receive an optical fiber 120 with enough space around the optical fiber 120 to allow for coarse alignment of the fiber prior to melting of the solder. As illustrated in FIG. 9A, the solder preform 130 is preferably a vertically oriented cylindrical shape, with flat bottom and top surfaces. The flat bottom surface lies on the heater/resistor 122 in the position described above. The flat top surface receives the bottom of the rod 506 when the probe head 340 is lowered, as described above. The solder preform 130 must contain enough solder to produce a sufficiently strong fiber lock joint. In one actual embodiment of the invention, the solder preform contains 28 mg of solder.

As noted above, the solder preform 130 rests on the gold layer 612 of the pad 609. See FIG. 6. An optical fiber 120 inserted through the aperture 628 in the solder preform 130 is aligned in the manner herein described. Thereafter, the heater/resistor is energized, causing the solder to melt. The melted solder is allowed to cool and resolidify. The resolidified solder creates a fiber lock joint, as illustrated in FIG. 9B. The solder is bonded to the nickel layer 610 (FIG. 6) and the optical fiber 120 is bonded to the solder.

Figure 10:
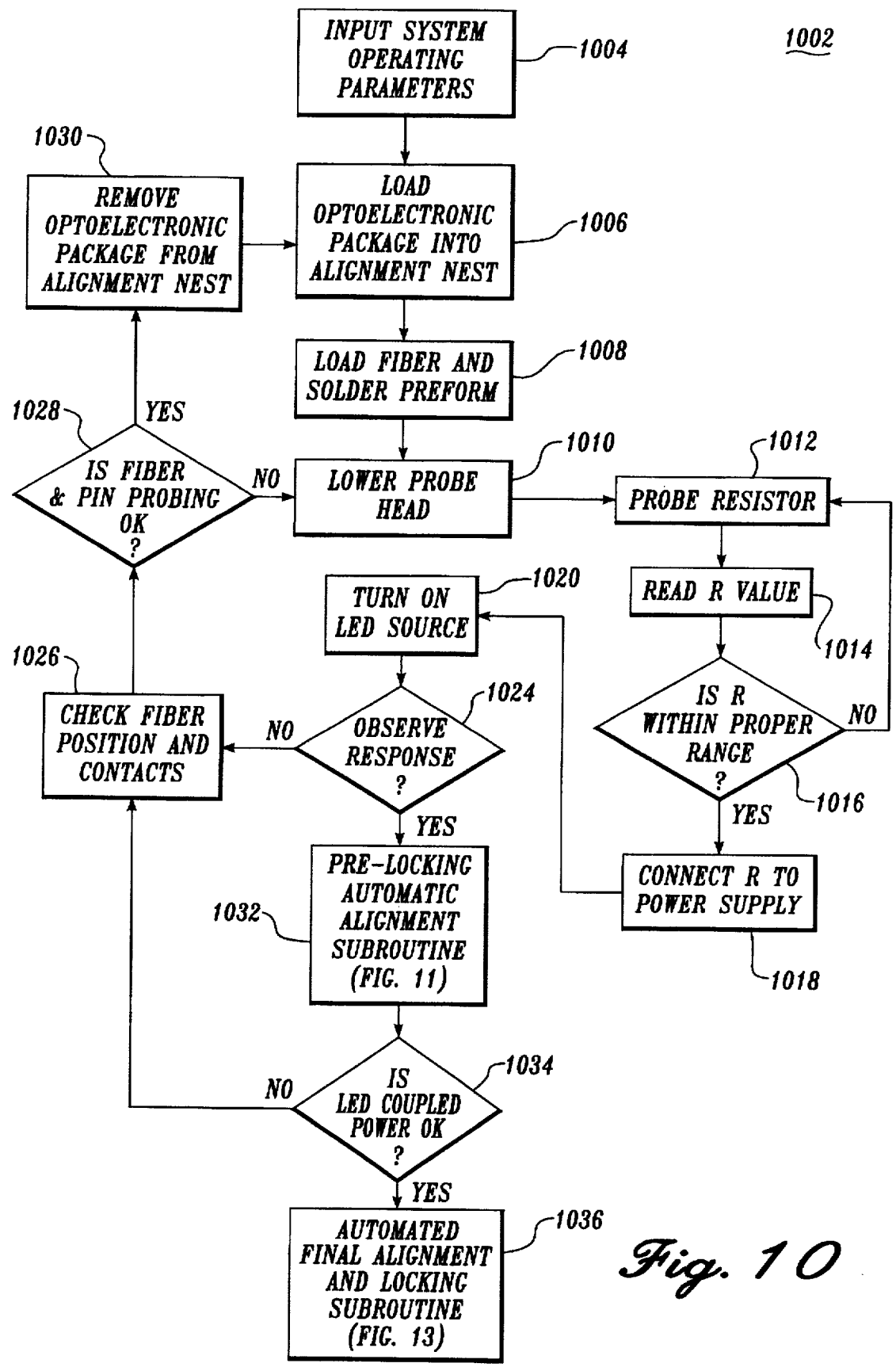
FIG. 10 is a flow diagram illustrating the method of operating the automatic alignment and locking system shown in FIGS. 7 and 8.

FIG. 10 is a flow diagram illustrating the operation of an automatic alignment and locking system formed in accordance with the invention. As illustrated in FIG. 10, the method 1002 of employing the automatic alignment and locking system begins, at step 1004, with an operator inputting system-operating parameters to the computer 704. The system-operating parameters are described below. At step 1006 the operator loads an optoelectronic hybrid package 102 onto the alignment nest fixture 304 (FIG. 3) of the alignment fixturing setup. At step 1008, an operator loads an optical fiber 120 and a preform 130 by feeding the optical fiber 120 through the hermetic feedthrough 114 mounted in the package sidewall 118 of the optoelectronic hybrid package 102 and through the hole in the preform, and positions the preform onto the gold layer 612 of the pad 609. Prior to loading the preform 130, a thin layer of flux is applied to the preform 130 or to the pad 609. Next, at step 1010, the probe head is lowered.

After the above manual steps take place, the resistance of the resistor/heater 122 is measured to determine if the resistance of the resistor/heater lies within an acceptable range of resistance values. This occurs at step 1012. The switch 722 (FIG. 7) is set to connect the resistor probes 502a and 502b to the resistance-measuring digital multimeter 724, which measures the resistance of the resistor/heater 122. At step 1014, the measured resistance is read by the computer 704 and displayed on the monitor 706. At step 1016, a test is made by the computer to determine if this resistance is within a predetermined acceptable range. If the resistance is outside the acceptable range, either the resistor/heater 122 is bad or the contact with the resistor probes 502a and 502b is poor. After corrective action is taken, the process loops back to step 1012 and the resistance is again measured and displayed. In one actual embodiment of the invention, the predetermined acceptable resistance range is 12 to 18 ohms.

If, at step 1016, the resistance is within the acceptable range, the switch 722 (FIG. 7) is reset to connect the power supply 726 to the resistor probes 502a, 502b. This occurs at step 1018. As a result, current flows through the resistor/heater 122, when the power supply 726 is turned on by the computer. At step 1020, the LED 720 (FIG. 7) or 850 (FIG. 8) is turned on. In the case of the optoelectronic receiver automatic alignment and locking system (FIG. 7), this is accomplished by turning on the precision current source 721 either manually or by a suitable computer-produced control signal (not shown) connected to the remote LED 720. In the case of the optoelectronic transmitter automatic alignment and locking system, this is accomplished by the computer turning on the precision current source 821 connected to the optoelectronic device 112 mounted in the device submount 108 of the optoelectronic package.

At step 1024, a test is made to determine if light is passing through the optical fiber 120. This test is accomplished by the computer receiving a current measurement from the current measuring digital multimeter 728 (FIG. 7) or from the optical power meter 854 (FIG. 8). If, at step 1024, a response is not observed by the computer, at step 1026, the fiber position and probe contact points are checked. This is done manually. If, as shown at step 1028, a determination is made that either the fiber position and/or the probe contacts are satisfactory, the probe head is raised (if necessary), the appropriate corrective action takes place and the process returns to step 1008, where the probe head 340 is lowered into place. If, at step 1028, the fiber position and probe contacts are determined to be satisfactory, at step 1030, the optoelectronic package 102 is removed. Then the process cycles to step 1006, where the new optoelectronic package is loaded into the alignment nest.

Figure 11:
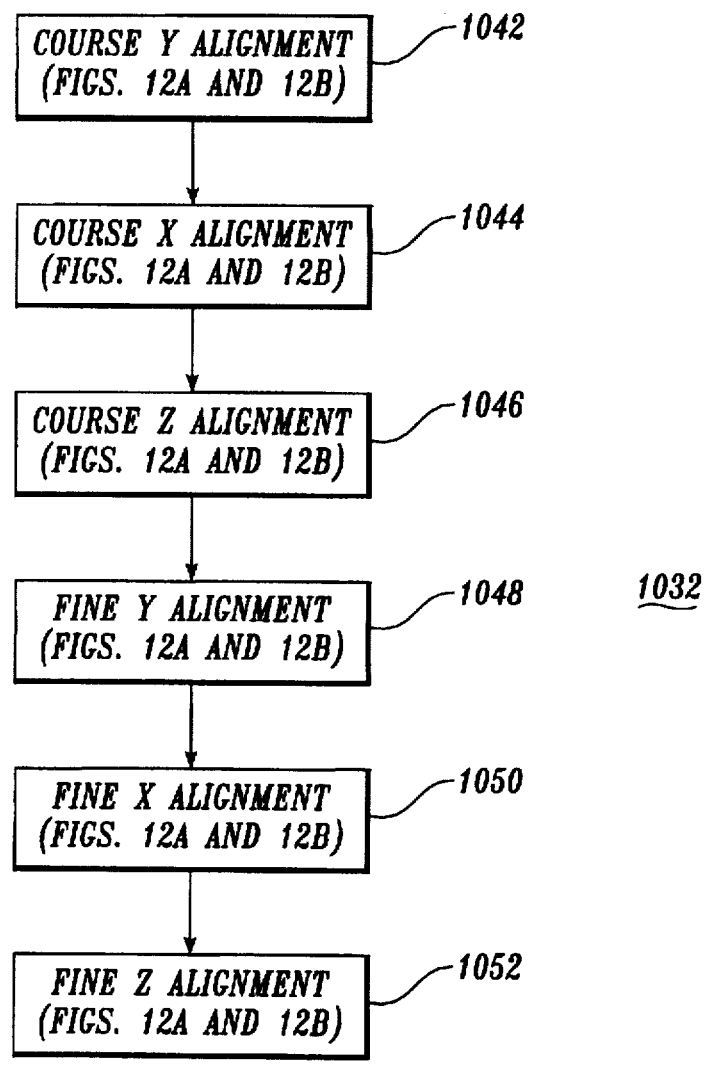
FIG. 11 is a flow diagram illustrating a prelocking subroutine suitable for use in the method illustrated in FIG. 10.
Figure 13:
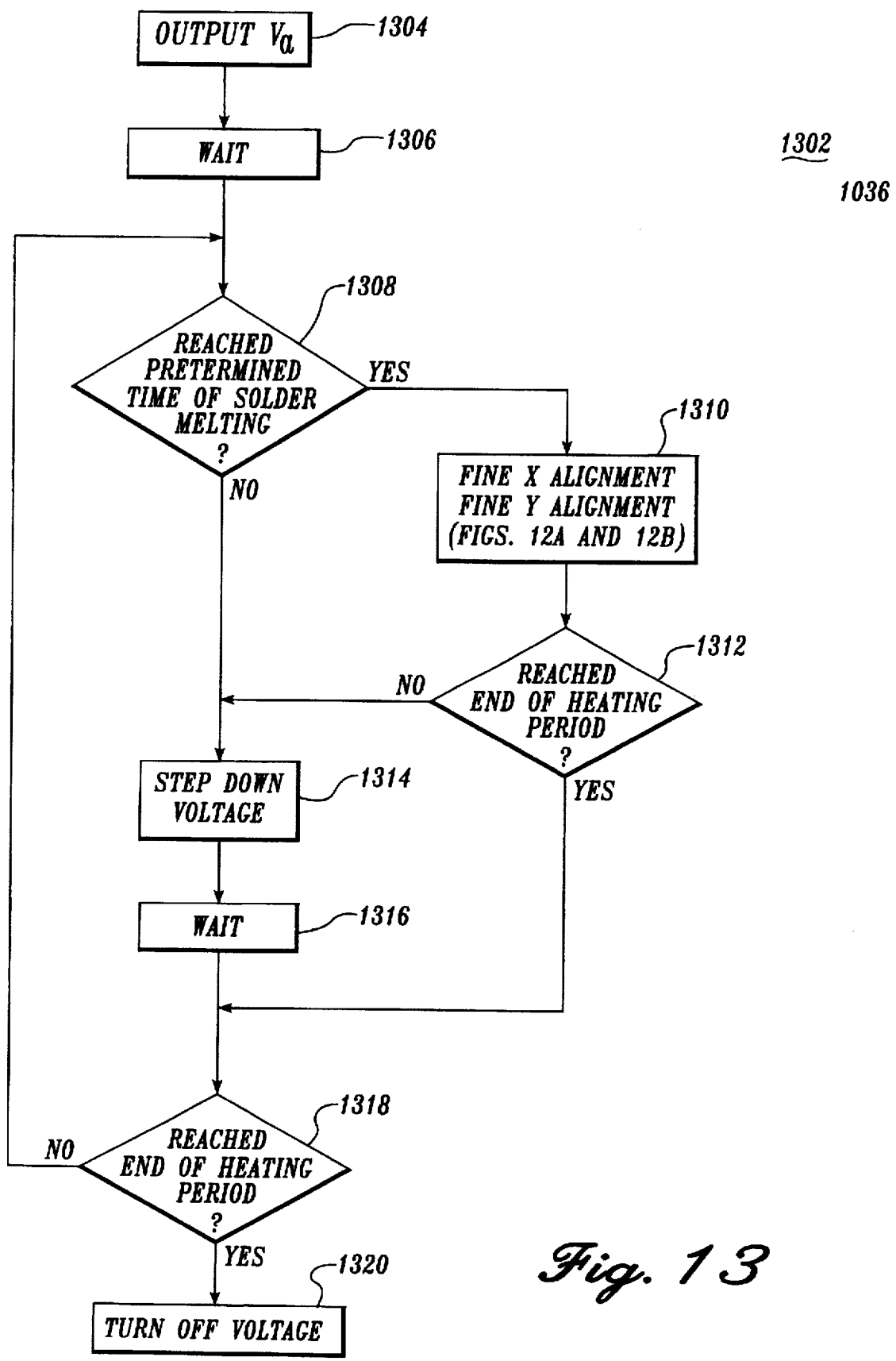
FIG. 13 is a fine alignment and locking subroutine suitable for use in the method illustrated in FIG. 10.

If, at step 1024, a proper light response is observed by the computer, at step 1032, a pre-locking automatic alignment subroutine occurs. A suitable pre-locking automatic alignment subroutine is illustrated in FIG. 11 and described below. After the pre-locking automatic alignment subroutine is finished, at block 1034, a test is made to determine if the LED coupled power reading by either the current-measuring digital multimeter 728 (FIG. 7) or the optical power meter 854 (FIG. 8), lies above a predetermined lower value. In one actual embodiment, the predetermined lower value is a signal indicating that the received light power is greater than 20 μW. If not above this value, processing loops back to step 1026. If, at step 1034, the LED coupled power reading is determined to be above the predetermined lower value, the program cycles to a final alignment and locking subroutine 1036. A suitable final alignment and locking subroutine is illustrated in FIG. 13 and described below. During the automated final alignment and locking subroutine, the solder preform 130 is heated, the optical fiber 120 is finely aligned with the optoelectronic device, and the solder is cooled, locking the optical fiber in its final, aligned position.

Two basic searching techniques can be used to align an optical fiber with an optoelectronic device—a closed loop technique and an open loop technique. In a closed loop technique, the fiber is moved by steps a fixed distance in each direction along a particular axis, and data is acquired at each step. Upon completion of movement, the maximum signal position is identified. The fiber is then moved to the maximum position. The process is then repeated for another axis. After alignment along all axes, the fiber is in its final position. This technique is necessary when the light emitter is a multitransverse mode laser diode, which has many "side-lobes" in its emission output patterns.

In an open loop technique, the fiber 120 is moved along an axis in each direction step by step. At each step of the movement, the current signal strength is compared with the signal strength from the previous step. If the signal strength in the current step is greater than the signal strength in the previous step, movement is continued in the current direction. If the signal strength decreases, the direction of fiber 120 movement is reversed. Movement ends when the fiber is at the location where the signal strength is the greatest. An open loop search can be used only for optoelectronic devices that do not have multiple peaks in a search path. The present invention utilizes an open loop searching algorithm to align the optical fiber 120 with the optoelectronic device 112 both during prealignment (FIG. 11) and during final alignment (FIG. 13).

FIG. 11 is a flow diagram illustrating a pre-locking automatic alignment subroutine suitable for use in the method of operation shown in FIG. 10. The pre-locking automatic alignment subroutine illustrated in FIG. 11 includes three coarse alignment routines 1042, 1044, and 1046 followed by three fine alignment routines 1048, 1050, and 1052, all of which are substantially identical except for axial (x, y, z) and numerical distance (coarse, fine) differences. As a result, only one alignment routine, illustrated in FIGS. 12A and 12B, is described in detail.

Figure 12A:
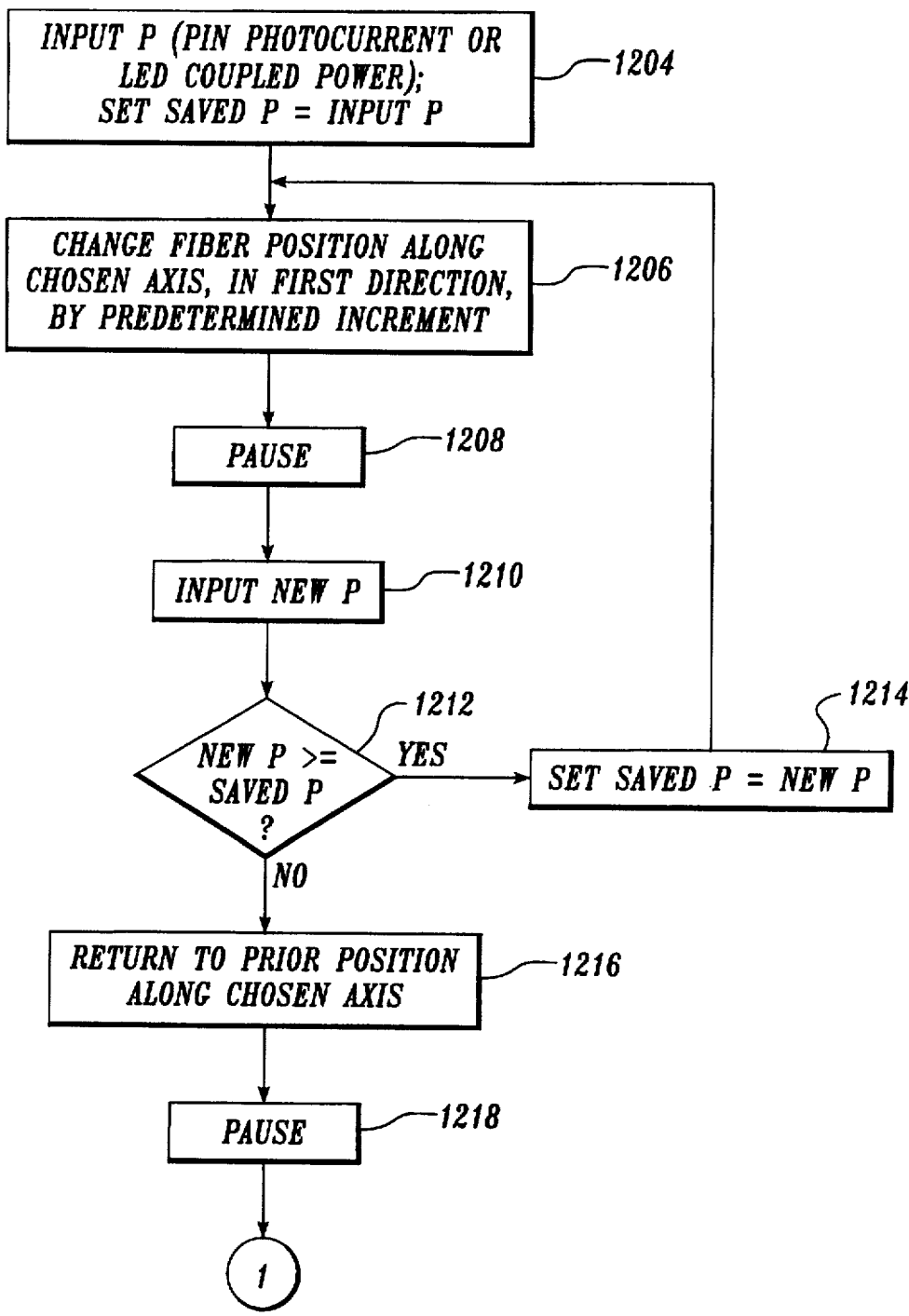
FIGS. 12A and 12B are a flow diagram illustrating an alignment subroutine suitable for use in the prelocking subroutine illustrated in FIG. 11 and in the automated fine alignment and locking subroutine illustrated in FIG. 13.
Figure 12B:
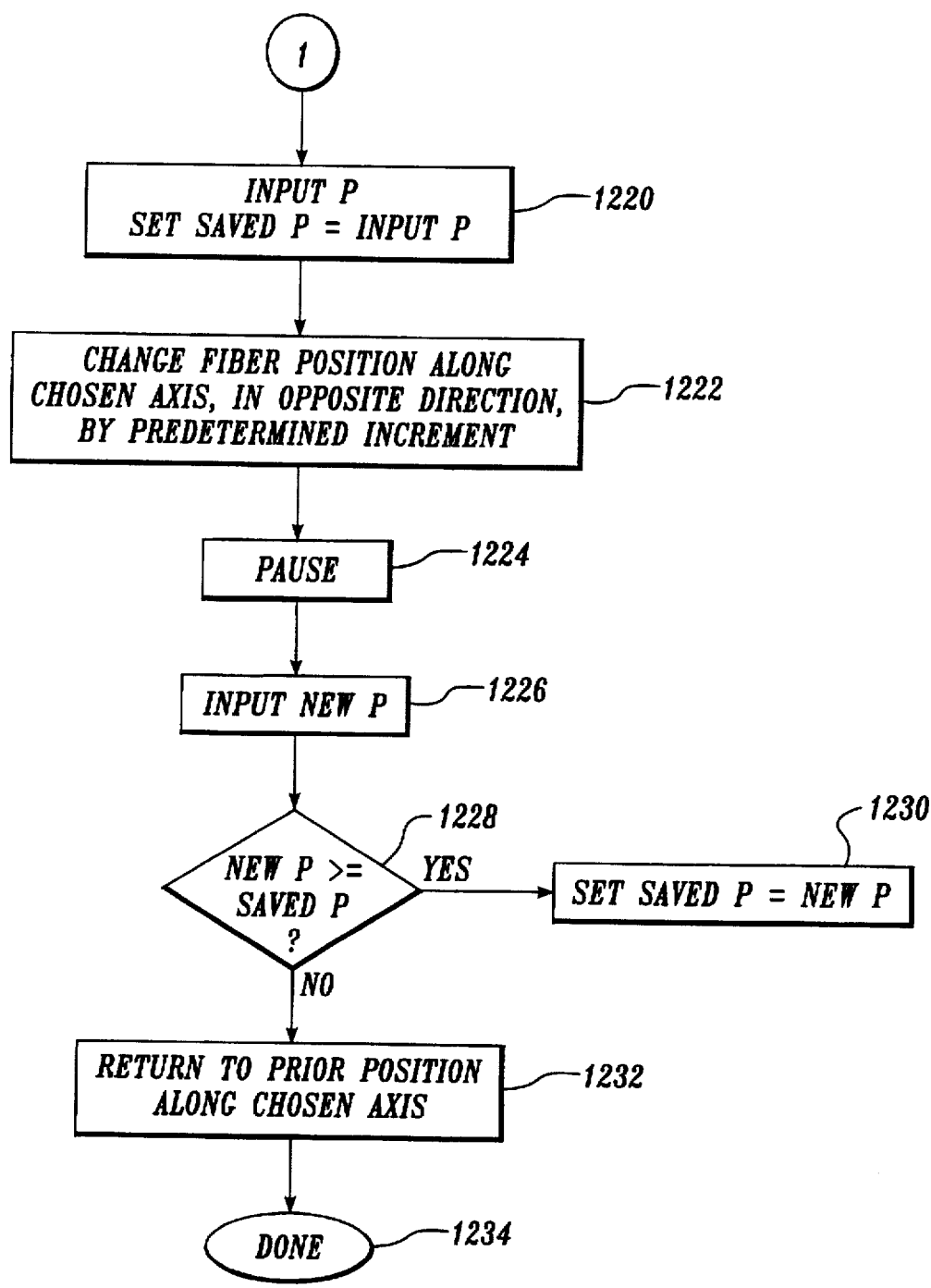

The alignment routine illustrated in FIGS. 12A and 12B is based on an open loop search algorithm. Beginning at any point along the axis to be searched, i.e., the x, y, or z axis, at step 1204, the power value, P, measured at the beginning position is inputted. P represents the PIN photocurrent as measured by the current measuring digital multimeter 728 (FIG. 7) in the case of an optoelectronic receiver, or the LED coupled power as measured by the optical power meter 854 (FIG. 8) in the case of a photoelectronic transmitter. The input P value is stored as a saved P value. At step 1206, the fiber 120 position is changed along the axis in a first direction by a predetermined increment. The predetermined increment is based on whether the alignment routine is a coarse or fine alignment routine. While the coarse and fine alignment routines for each axis could have a different incremental value, preferably the same coarse and fine values are used along all of the axes. In one actual embodiment of the invention, the coarse alignment increment is 10 μm and the fine alignment increment is 1 μm. At step 1208, the process pauses to allow for fiber movement to be completed before new data is acquired. In one actual embodiment, a pause time of 0.46 second is employed for coarse alignment, and a pause time of 0.18 second is employed for fine alignment.

At step 1210, a new P value is measured and input. At step 1212, the new P input value is compared with the saved P value. If the new P value is greater than or equal to the saved P value, at step 1214, the old saved P value is replaced with the new P value, and the process loops back to step 1206. As a result, the search continues in the same direction.

If, at step 1212, the saved P value is greater than the new P value, the optimal position has been passed. When this occurs, at step 1216, the fiber 120 is returned to the prior position along the chosen (same) axis. Thereafter the process pauses, at step 1218, to allow the fiber to return to its prior position before data is acquired. Then, at step 1220, P is measured and input. Then the old saved P value is replaced with the new P value. At step 1222, the direction of searching is reversed. More specifically, the fiber is moved by the predetermined increment in the opposite direction along the chosen axis. After a pause at step 1224, a new P value is measured and input at step 1226. Next, at block 1228, a test is made to determine if the new P value is equal to or greater than the saved P value. If the new P value is equal to or greater than the saved P value, the old saved P value is replaced with the new P value. Then the process cycles to step 1222 and the loop is repeated.

If, at block 1228, the saved P value is found to be greater than the new P value, at step 1232, the optical fiber is returned to its prior position along the chosen axis, and the process is finished.

The end result of the routine or process illustrated in FIGS. 12A and 12B and described above is to position the optical fiber at the location along the chosen axis where the maximum amount of light is transferred between the optoelectronic device 112 and the optical fiber. As shown in FIG. 11, the open loop search process is executed along all axes, i.e., along the x, y, and z axes. Coarse alignment along all three axes is followed by fine alignment along all three axes. Alternatively, other sequences can be used. For example, the alignment sequence may comprise a coarse alignment along the y-axis, a coarse alignment along the x-axis, a fine alignment along the y-axis, a fine alignment along the x-axis, a coarse alignment along the z-axis, and a fine alignment along the z-axis. Alternatively, only a single alignment process, i.e., a fine or coarse alignment process only along each axis could be implemented, with the obvious loss of speed of alignment or resolution.

Careful control of the voltage applied at the resistor terminals 124 is necessary to achieve the proper temperature for melting the solder preform without detrimentally impacting the other elements of the optoelectronic package. More specifically, the temperature and duration of heat produced by the power applied to the resistor terminals must be sufficient to melt the solder with minimum material erosion. Further, overheating, which can also cause flux to char, if flux is used with the solder, must be avoided. FIG. 13 illustrates a process for controlling the application of voltage to the resistor/heater in accordance with the invention that achieves these desired results. Prior to describing FIG. 13, attention is directed to FIG. 14, which is a graph illustrating changes in voltage and temperature that occur over time as power is applied.

In one actual embodiment of the invention, the solder preform 130, which consisted of Sn96.5 Ag3.5, had a melting temperature of 221° C. The nominal resistance of the resistor/heater 122 of this embodiment of the invention was 15 ohms. It was experimentally found that applying 17.5 volts to the resistor/heater 122 caused the desired 221° C. solder-melting temperature to be achieved. Since the actual resistivity value of a resistor/heater 122 varies from a nominal value, e.g., 15 ohms, the resistance $R_m$ of each resistor/heater 122 should be measured before applying current. The following formula can be used to calculate the voltage ($V_a$) required to achieve the same power dissipation:

$$V_a = [(17.5^2/15) \cdot R_m]^{1/2} \quad (1)$$

The table below illustrates the voltage value and time schedule used by the preferred embodiment of the invention to achieve proper heating of the solder preform without excessive material erosion. In the table, the values in the column labeled "VOLTAGE" actually represent the control signals transmitted from the computer 704 to the power supply 726. Depending on the nature of the chosen power supply, minimal delays may exist between the computer control signal and the actual voltage applied to the resistor/heater 122. The "STEPS" column indicates the number of voltage change steps that occur during a particular interval. The purpose of the steps is described below.

TABLE 1

| VOLTAGE VALUE AND TIME SCHEDULE | | |
|---|---|---|
| VOLTAGE | TIME Range | NUMBER OF STEPS |
| 0 to $V_a$ | From 0th to 8th second | 1 |
| $V_a$ to 0.94 $V_a$ | From 8th to 16th second | 20 |
| 0.94 $V_a$ to 0 | After the 16th second or the final second after the fine alignment at the preform molten state | 1 |

Figure 14:
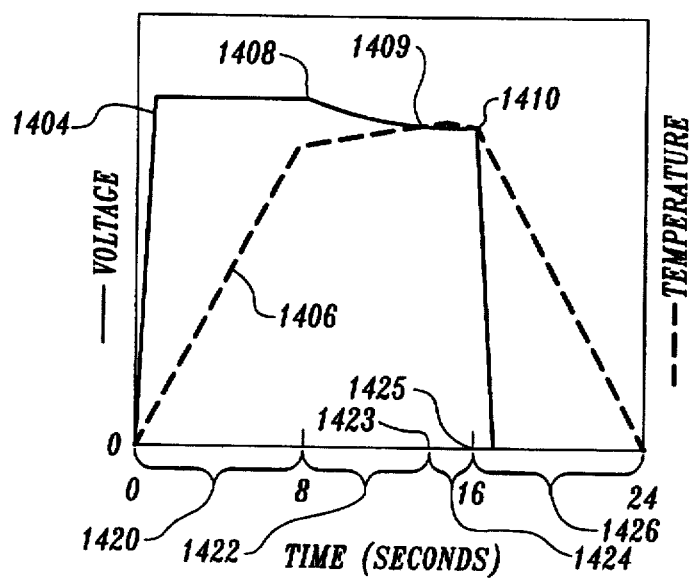
FIG. 14 is a graph illustrating changes in voltage and temperature that occur over time during the fine alignment and locking subroutine illustrated in FIG. 13.

FIG. 14 is a graphical representation of the voltage value and time schedule set forth in the above table. The solid line 1404 represents the voltage applied to the heater/resistor 122 over time. The dotted line 1406 represents the temperature applied to the solder preform 130. As summarized in the above table, and illustrated in FIG. 14, at 0, $V_a$ is applied to the heater/resistor. After a short ramp-up period, the voltage remains constant at $V_a$ during the interval 1420. The constant voltage is denoted as a single step. During this interval, the temperature ramps up. See line 1406. At point 1408, during time intervals 1422 and 1424, the voltage is reduced to 0.94 $V_a$. The reduction occurs in a stepwise manner that includes 20 steps.

Even though the voltage drops, the temperature continues to rise. At point 1423, the resistor/heater 122 reaches a temperature (221° C.) that causes the solder preform 130 to melt. At this point, an open loop automatic fine alignment routine of the type shown in FIG. 12 and described above begins. As will be better understood from viewing FIG. 13 and the following discussion, the fine alignment routine finely aligns the optical fiber 120 along the x and y axes, which are the axes lying orthogonal to the z-axis.

At point 1425 the final fine alignment routine ends. Typically, this occurs within two seconds of beginning the fine alignment process (point 1423). If the final fine alignment process completes before the scheduled end of the heating period (point 1225), voltage is continued to be applied and reduced in the stepwise manner described above. At the end of the heating period, if final fine alignment is completed, the voltage is turned off (point 1425). After a short ramp-down period, the voltage drops to zero. If the final fine alignment process requires time beyond the 20th step (time intervals 1422 and 1424), the voltage is maintained at 0.94 $V_a$ until alignment is completed and, then, is reduced to 0.

The total solder molten time interval 1424 must be limited in order to avoid dissolving all of the nickel adhesion layer located between the solder preform and the nickel-chromium alloy layer 604. See FIG. 6. The maximum allowable period is 5 seconds for the parameters set forth in the foregoing table and described above. After the voltage ends, the solder preform temperature gradually returns to room temperature during time interval 1426.

As will be appreciated by those skilled in this art and others, the voltage and time schedule to be used in an actual embodiment of the invention will depend on the resistance of the heater/resistor 122, the rate of heat dissipation of optoelectronic package 102, the thickness of the nickel layer 610, and the melting temperature of the solder preform 130, as well as other variables. The length of time that solder is molten must be sufficient to allow fine alignment of the optical fiber 120. Further, the thickness of the nickel layer 610 must be adequate for the nickel layer to survive erosion while molten solder is in contact with the nickel layer. Because the resistance of nickel-chromium alloy changes when it is heated for some period of time, minimizing the time of heating reduces the introduction of complexities in the soldering process, specifically, changes in the amount of voltage that must be applied.

FIG. 13 is a flow diagram illustrating a final alignment and locking subroutine 1036 suitable for achieving the voltage value and time schedule illustrated in FIG. 14 and described above. At step 1304, the computer 704 causes the power supply to output voltage $V_a$. At step 1306, the process waits for the temperature of the resistor/heater 122, and correspondingly the temperature of the solder preform 130, to rise. Steps 1304 and 1306 occur during the time interval 1420 illustrated in FIG. 14. At step 1308, at a time represented by point 1408 in FIG. 14, a test is made to determine if the predetermined time to solder melting has elapsed. If the predetermined time has not elapsed, at step 1314, the voltage is decreased by an amount represented by ($V_a-V_b$) /M, where $V_b$ represents the voltage at point 1410 in FIG. 14 (0.94 $V_a$), and M represents the number of steps between points 1408 and 1410. At step 1316, the process waits the step time interval while maintaining a constant voltage.

At step 1318, a test is made to determine if the end of the heating period has been reached, i.e., if point 1410 has been reached. If not, the process cycles to step 1308. When, at step 1308, the predetermined time to solder melting has elapsed, which is point 1409 in FIG. 14, at step 1310, fine alignment routines of the type shown in FIGS. 12A and 12B and described above occur along the x and y axes. Then, at step 1312, a test is made to determine if the heating period has ended. If not, the process cycles to step 1314. When the heating period ends, step 1312 or 1318, the computer turns off the power supply. See step 1320.

The table below lists the values of some of the key software-controlled parameters of the pre-locking automatic alignment subroutine 1032 and the automated final alignment and locking subroutine 1036 utilized in one actual embodiment of the invention. Some of these values have been set forth above.

TABLE 2

KEY SOFTWARE CONTROLLED PARAMETERS

| Parameters | Definition | Default Value |
|---|---|---|
| Wait time | Waiting time after $V_a$ is applied to the power supply | 8 seconds |
| Dwell time | Time for voltage to change from $V_a$ to $0.94 \cdot V_a$ | 8 seconds |
| Voltage steps | The number of steps to change from $V_a$ to $0.94 \cdot V_a$ | 20 |
| Temperature C. | The room temperature | 23° C. |
| Molten alignment time | Expected time for final fine alignment | 2 seconds |
| Coarse wait time | Wait time after each 10 μm stage of coarse alignment in the x, y, and z directions for data acquistion | 0.46 second |
| Fine wait time | Wait time after each 1 μm stage of fine alignment in the x, y and z directions for data acquisition | 0.18 second |

The wait time parameter is the time interval 1420 in FIG. 14. The dwell time parameter is the time for the voltage output to change from $V_a$ to $0.94 \cdot V_a$, or the time between points 1408 and 1410. This is equivalent to the combination of time interval 1422 plus the time interval 1424. The voltage steps parameter is the number of steps during which the voltage $V_a$ is reduced to $0.94 \cdot V_a$. In the situation where fine alignment of the optical fiber 120 occurs faster than the expected time for fine alignment (molten alignment time), the program could be modified to end when alignment is complete, since it is not necessary to actually obtain a voltage of $0.94 \cdot V_a$. In such a program, the voltage can be reduced to 0 when fine alignment is completed. The molten alignment time parameter is the expected time needed for fine alignment, i.e., the time interval 1424 shown in FIG. 14. The coarse and fine wait times are the times required for fiber repositioning to occur before new data is acquired.

While the preferred embodiment of the invention has been illustrated and described, it will be appreciated that various changes can be made therein without departing from the spirit of the invention. For example, the schedule of voltage and time control could be changed, or the steps carried out in other ways designed to accomplish the same functional result. Hence, it is to be understood that within the scope of the appended claims the invention can be practiced otherwise than as specifically described herein.

The embodiments of the invention in which an exclusive property or privilege is claimed are defined as follows:

1. An alignment and locking system for aligning an optical fiber with an optoelectronic device secured to a substrate and locking the optical fiber in place, said system comprising:
   a computer;
   a thin metallic resistor/heater overlying the substrate;
   a solder preform overlying said thin metallic resistor/heater, said optical fiber positioned adjacent said solder preform, said solder preform having a known melting temperature and the ability to form a chemical bond with said thin metallic resistor/heater;
   a power source for supplying electrical power to said thin metallic resistor/heater suitable for causing said solder preform to melt based on power control signals received by said power source from said computer;
   an instrument for determining the amount of light passing between said optical fiber and said optoelectronic device and supplying related received power signals to said computer; and
   a manipulator for aligning said optical fiber with said optoelectronic device based on alignment control signals received from said computer, said alignment control signals being based on said received power control signals, said manipulator aligning said optical fiber while said solder preform is melted.

2. The system of claim 1, wherein said thin metallic resistor/heater comprises a thin layer of nickel-chromium alloy.

3. The system of claim 2, wherein said thin metallic resistor/heater further comprises a thin layer of nickel located between said thin layer of nickel-chromium alloy and said solder preform.

4. The system of claim 3, further comprising a thin layer of gold located between said layer of nickel and said solder preform.

5. The system of claim 1, wherein, prior to melting, said solder preform includes a hole sized to receive said optical fiber.

6. The system of claim 5, wherein said solder preform comprises Sn and Ag.

7. The system of claim 5, wherein said solder preform comprises Sn96.5 Ag3.5.

8. The system of claim 1, wherein said optoelectronic device includes terminals, said thin metallic resistor/heater includes terminals, and said manipulator includes a probe head, said probe head including probes positioned to contact the terminals of said optoelectronic device and said thin metallic resistor/heater.

9. The system of claim 8, wherein said probe head also includes a rod positioned to contact said solder preform.

10. The system of claim 9, wherein said probe head lies above said substrate and is lowered such that said probes contact said terminals of said optoelectronic device and said thin metallic resistor/heater, and said rod contacts said solder preform prior to power being applied to said thin metallic resistor/heater and said optical fiber being manipulated.

11. The system of claim 10, wherein said manipulator includes a manually operated mechanism for manipulating said optical fiber prior to said optical fiber being aligned while said solder is melted.

12. The system claimed in claim 11, wherein said manipulator manipulates said optical fiber along three orthogonally oriented axes.

13. The system of claim 1, wherein said computer controls the magnitude and duration of the voltage applied to said thin metallic resistor/heater by said power source.

14. The system of claim 13, wherein, after a predetermined voltage is applied to said thin metallic resistor/heater for a predetermined interval, the voltage is sequentially stepped down to a lower voltage level.

15. A method of aligning an optical fiber with an optoelectronic device so that the optimum amount of light passes between the optical fiber and the optoelectronic device, said method comprising:
   positioning an optical fiber adjacent a solder preform located atop a thin metallic resistor/heater positioned on a substrate that also supports an optoelectronic device;

supplying electrical power to said thin metallic resistor/heater for a predetermined time period sufficient for the thin metallic resistor/heater to heat the solder preform to the melting point of the solder;

passing light between said optical fiber and said optoelectronic device while said solder preform is melted;

detecting the amount of light passing between said optical fiber and said optoelectronic device while said solder preform is melted; and automatically manipulating the position of said optical fiber relative to said optoelectronic device so as to increase the amount of light passing between said optical fiber and said optoelectronic device while said solder preform is melted.

16. The method of claim 15, wherein the level of voltage of the electrical power supplied to said thin metallic resistor/heater changes during said predetermined time period.

17. The method of claim 16, wherein a first level of voltage occurs for a first predetermined period of time, and said first level of voltage is stepped down to a second level of voltage after said first predetermined period of time has elapsed.

18. The method of claim 17, wherein said optical fiber is automatically manipulated along each axis of a plurality of orthogonal axes by:

moving the optical fiber relative to the optoelectronic device in steps in one direction;

detecting the amount of light transmitted between the optical fiber and said optoelectronic device after each step; and reversing the direction of movement of the optical fiber relative to the optoelectronic device if the amount of light detected after the latest step is less than the amount of light detected after the preceding step.

19. The method of claim 18, wherein the solder preform comprises Sn and Ag.

20. The method of claim 18, wherein the thin metallic resistor/heater is formed of nickel-chromium alloy.

21. The method of claim 20, wherein the solder preform has a hole through said preform, the hole sized to receive the fiber optic member.

* * * * *